(12) United States Patent
Satou et al.

(10) Patent No.: US 10,271,414 B2
(45) Date of Patent: Apr. 23, 2019

(54) DROPLET DETECTOR AND EXTREME ULTRAVIOLET LIGHT GENERATING APPARATUS

(71) Applicant: Gigaphoton Inc., Tochigi (JP)

(72) Inventors: Kouichi Satou, Oyama (JP); Takayuki Yabu, Oyama (JP); Yoshifumi Ueno, Oyama (JP); Hirokazu Hosoda, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/697,915

(22) Filed: Sep. 7, 2017

(65) Prior Publication Data

US 2018/0007771 A1    Jan. 4, 2018

Related U.S. Application Data

(63) Continuation of application No. PCT/JP2016/061151, filed on Apr. 5, 2016.

(30) Foreign Application Priority Data

Apr. 23, 2015   (JP) .................... PCT/JP2015/062433

(51) Int. Cl.
*H05G 2/00* (2006.01)
*H01S 3/10* (2006.01)

(52) U.S. Cl.
CPC .............. *H05G 2/008* (2013.01); *H01S 3/10* (2013.01); *H05G 2/005* (2013.01); *H05G 2/006* (2013.01); *G21K 2201/06* (2013.01)

(58) Field of Classification Search
USPC .................................................... 250/504 R
See application file for complete search history.

(56) References Cited

U.S. PATENT DOCUMENTS

2007/0228301 A1    10/2007  Nakano
2012/0305811 A1*  12/2012  Wakabayashi ......... H05G 2/003
                                                            250/504 R
(Continued)

FOREIGN PATENT DOCUMENTS

JP    2006-110774 A    4/2006
JP    2007-266234 A    10/2007
(Continued)

OTHER PUBLICATIONS

International Search Report issued in PCT/JP2016/061151; dated Jun. 14, 2016.
(Continued)

*Primary Examiner* — Kiet T Nguyen
(74) *Attorney, Agent, or Firm* — Studebaker & Brackett PC

(57) ABSTRACT

The stability of operations of an EUV light generating apparatus is improved. A droplet detector may include: a light source unit configured to emit illuminating light onto a droplet, which is output into a chamber and generate extreme ultraviolet light when irradiated with a laser beam; a light receiving unit configured to receive the illuminating light and to detect changes in light intensities; and a timing determining circuit configured to output a droplet detection signal that indicates that the droplet has been detected at a predetermined position within the chamber, based on a first timing at which the light intensity of the illuminating light decreases due to the droplet being irradiated therewith and a second timing at which the light intensity of the illuminating light increases.

8 Claims, 29 Drawing Sheets

(56) References Cited

U.S. PATENT DOCUMENTS

| | | |
|---|---|---|
| 2014/0353528 A1 | 12/2014 | Hayashi et al. |
| 2015/0168848 A1* | 6/2015 | Tanaka ................ G03F 7/70041 355/67 |
| 2015/0179401 A1* | 6/2015 | Gambino ............... H05G 2/006 250/573 |
| 2015/0189730 A1 | 7/2015 | Moriya et al. |
| 2015/0342015 A1 | 11/2015 | Hayashi et al. |
| 2016/0037616 A1 | 2/2016 | Saito et al. |

FOREIGN PATENT DOCUMENTS

| | | |
|---|---|---|
| JP | 2014-235805 A | 12/2014 |
| WO | 2014/042003 A1 | 3/2014 |
| WO | 2014/189055 A1 | 11/2014 |

OTHER PUBLICATIONS

Written Opinion issued in PCT/JP2016/061151; dated Jun. 14, 2016.

* cited by examiner

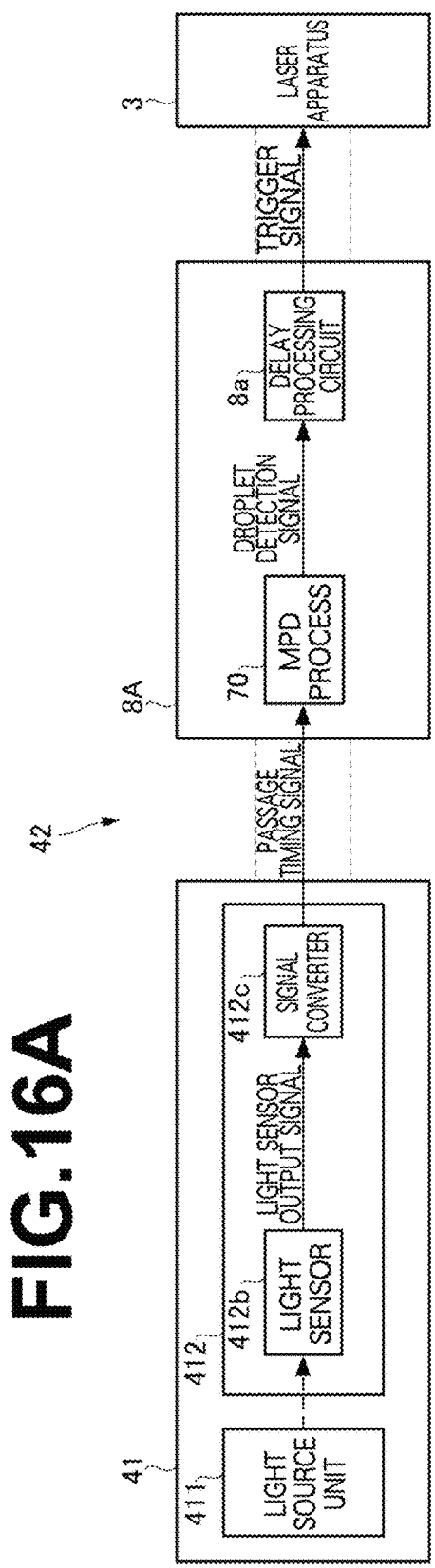

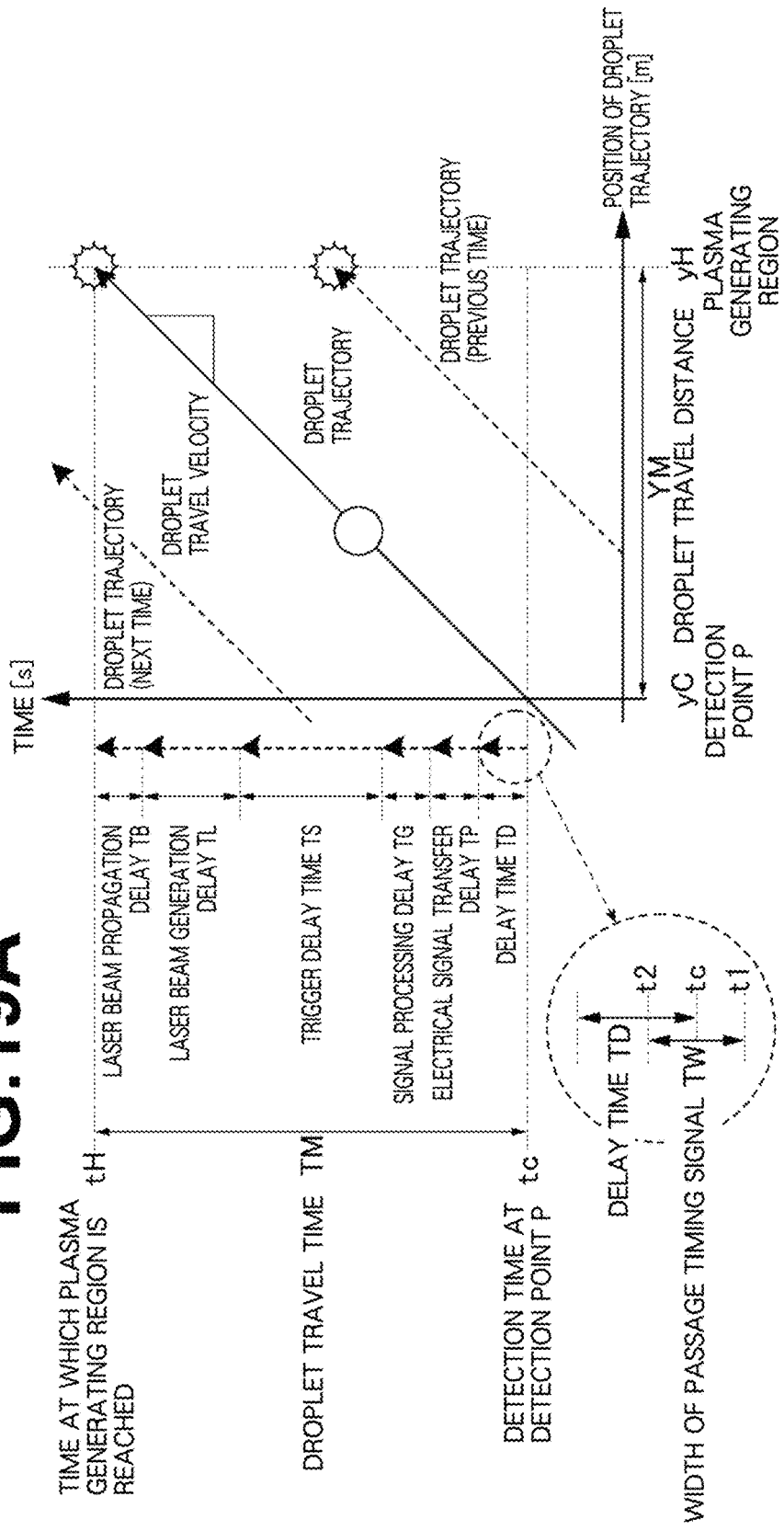

FIG.19B
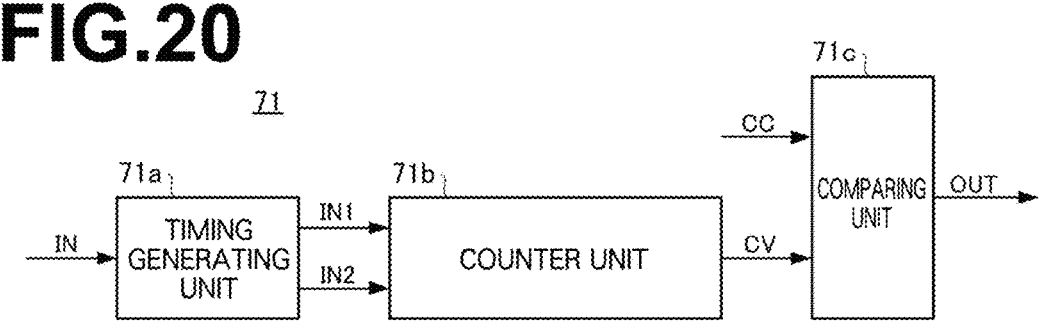
FIG.20
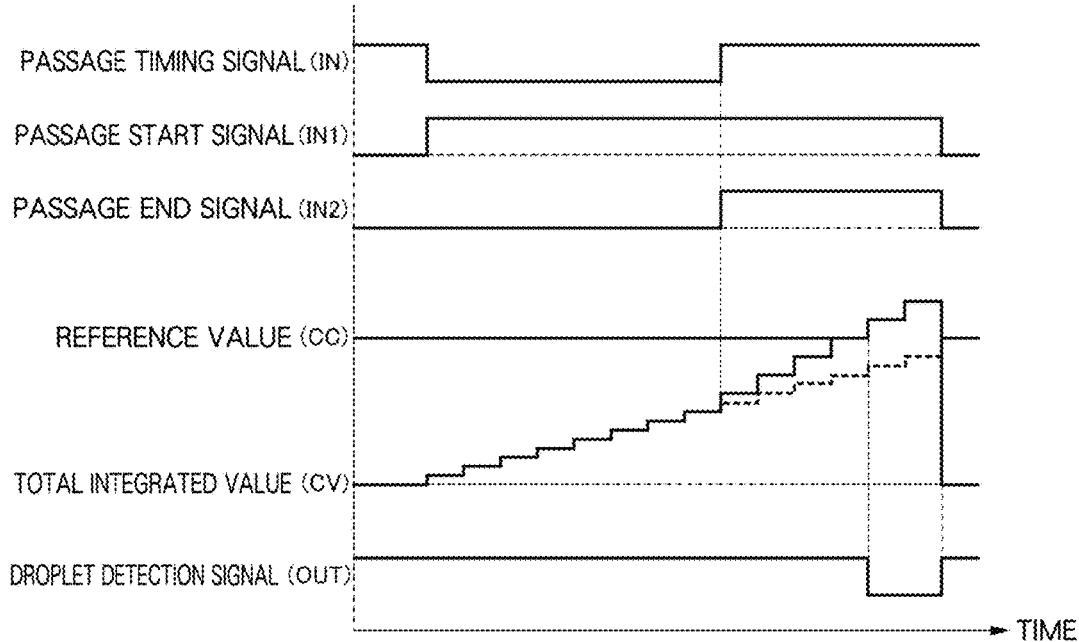
FIG.21

DROPLET DETECTOR AND EXTREME ULTRAVIOLET LIGHT GENERATING APPARATUS

CROSS REFERENCE TO RELATED APPLICATIONS

The present application is a Continuation application of International Application No. PCT/JP2016/061151 filed on Apr. 5, 2016 claiming the priority to International Application No. PCT/JP2015/062433 filed on Apr. 23, 2015. The contents of the applications are incorporated herein by reference in its entirety.

BACKGROUND

1. Technical Field

The present disclosure is related to an apparatus for generating extreme ultraviolet light (EUV).

2. Related Art

Recently, as semiconductor processes have become finer, transfer patterns for use in photolithography of semiconductor processes have also become finer. In the next generation, microfabrication at 70 nm to 45 nm, and further, microfabrication at 32 nm or less will be in demand. In order to meet this demand for microfabrication at 32 nm or less, there is expectation for development of an exposure apparatus in which an extreme ultraviolet (EUV) light generating apparatus that generates extreme ultraviolet (EUV) light having a wavelength of approximately 13 nm is combined with a reduced projection reflective optic system.

Three types of EUV light generating apparatuses have been proposed. The three types are: an LPP (Laser Produced Plasma) type apparatus that employs plasma which is generated by irradiating a laser beam onto a target substance; a DPP (Discharge Produced Plasma) type apparatus that employs plasma which is generated by electrical discharge, and an SR (Synchrotron Radiation) type apparatus that employs synchrotron orbital radiation.

RELATED ART DOCUMENTS

Patent Documents

[Patent Document 1]
International Patent Publication No. WO 2014/042003

SUMMARY

A droplet detector according to one aspect of the present disclosure may include:
a light source unit configured to emit illuminating light onto a droplet, which is output into a chamber and generate extreme ultraviolet light when irradiated with a laser beam;
a light receiving unit configured to receive the illuminating light and to detect changes in light intensities; and
a timing determining circuit configured to output a droplet detection signal that indicates that the droplet has been detected at a predetermined position within the chamber, based on first timings at which the light intensity of the illuminating light decreases due to the droplet being irradiated therewith and second timings at which the light intensity of the illuminating light increases.

An extreme ultraviolet light generating apparatus according to one aspect of the present disclosure may include:
a chamber, at a predetermined region within which extreme ultraviolet light is generated;
a target supply unit configured to output droplets so as to supply the droplets into the predetermined region;
a light source unit configured to emit illuminating light onto droplets at a predetermined position between the target supply unit and the predetermined region;
a light receiving unit configured to receive the illuminating light and to detect changes in light intensities;
a timing determining circuit configured to output droplet detection signals that indicate that the droplets have been detected at a predetermined position within the chamber, based on first timings at which the light intensity of the illuminating light decreases due to the droplets being irradiated therewith and second timings at which the light intensity of the illuminating light increases; and
a control unit that outputs signals which cause a laser apparatus to output a laser beam toward the predetermined region, based on the droplet detection signals.

BRIEF DESCRIPTION OF THE DRAWINGS

Embodiments of the present disclosure will be described below as examples, with reference to the attached drawings.

FIG. 16A is a diagram for explaining the configuration of a passage timing signal system provided in the EUV light generating apparatus illustrated in FIG. 15.

FIG. 19A is a diagram for explaining a temporal relationship between the travel distances of droplets and the set contents for delay times in each of the timing determining circuit and the delay processing circuit of the first embodiment.

FIG. 19B illustrates a table for explaining specific examples of set values for delay times TD in the first embodiment.

FIG. 20 is a diagram for explaining the configuration of a timing determining circuit provided in an EUV light generating apparatus according to a second embodiment.

FIG. 21 illustrates a time chart related to generation of droplet detection signals in the timing determining circuit of the second embodiment.

DETAILED DESCRIPTION OF THE PREFERRED EMBODIMENTS

Contents

Figure 1:
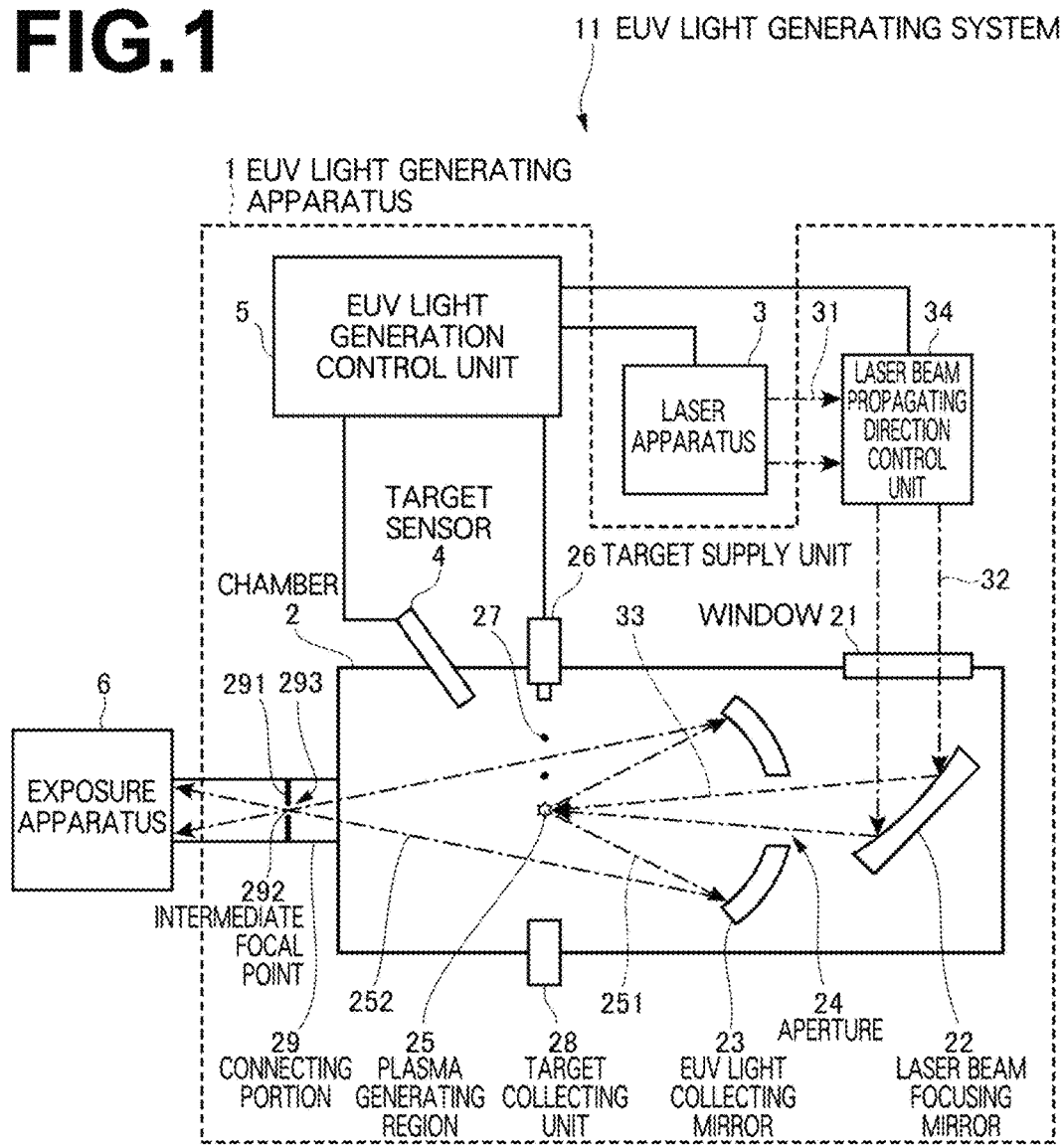
FIG. 1 is a diagram that schematically illustrates the configuration of an exemplary EUV light generating system of the LPP type.

1. Overview
2. Terms
3. Overview of EUV Light Generating System
   3.1 Configuration
   3.2 Operation
4. EUV Light Generating Apparatus including Droplet Detector
   4.1 Configuration: Entire Apparatus
   4.2 Operation: Entire Apparatus
   4.3 Configuration: Droplet Detector and Passage Timing Signal System
   4.4 Operation: Droplet Detector and Passage Timing Signal System
5. Problem
6. EUV Light Generating Apparatus Equipped with Timing Determining Circuit According to First Embodiment
   6.1 Configuration: Entire Apparatus
   6.2 Configuration: Droplet Detector and Passage Timing Signal System
   6.3 Operation: Control Unit
   6.4.1 Operation: Passage Time Midpoint Calculating Process
   6.4.2 Operation: Delay Time TD Calculating Process
   6.4.3 Operation: Droplet Detection Signal Generating Process
   6.4.4 Other: Specific Examples of Delay Time TD
   6.5 Effect
7. EUV Light Generating Apparatus Equipped with Timing Determining Circuit According to Second Embodiment
   7.1 Configuration
   7.2 Operation
8. EUV Light Generating Apparatus Equipped with Timing Determining Circuit According to Third Embodiment
   8.1 Configuration
   8.2 Operation
9. EUV Light Generating Apparatus Equipped with Droplet Detector and Light Sensor According to Fourth Embodiment
   9.1 Configuration
   9.2 Operation
10. EUV Light Generating Apparatus Equipped with Droplet Detector and Control Unit According to Fifth Embodiment
    10.1 Configuration
    10.2 Operation
11. EUV Light Generating Apparatus Equipped with Passage Timing Signal System According to Sixth Embodiment
    11.1 Configuration
    11.2 Operation
    11.3 Effect 12. EUV Light Generating Apparatus Equipped with Pressure Adjusting Mechanism and Timing Determining Circuit According to Seventh Embodiment
   12.1 Configuration
   12.2 Operation
   12.3 Effect
13. Hardware Environment of Control Units Embodiments of the present disclosure will be described in detail with reference to the attached drawings. The embodiments to be described below are illustrative examples of the present disclosure, and do not limit the scope of the present disclosure. In addition, not all of the configurations and operations of the embodiments to be described below are necessarily essential configurations and operations of the present disclosure. Note that common constituent elements will be denoted with the same reference numbers, and redundant descriptions will be omitted.

(1. Overview)

The present disclosure discloses at least the embodiments below.

A droplet detector 41 of the present disclosure may include: a light source 411 configured to emit illuminating light onto droplets 271, which are output into a chamber 2 and generate extreme ultraviolet light 251 when irradiated with a laser beam 33; a light receiving unit 412 configured to receive the illuminating light and to detect changes in light intensities; and a timing determining circuit 70, 71, or 72 configured to output droplet detection signals that indicate that the droplets 271 have been detected at a predetermined position within the chamber 2, based on first timings at which the light intensity of the illuminating light decreases due to the droplets 271 being irradiated therewith and second timings at which the light intensity of the illuminating light increases.

Thereby, according to the droplet detector 41 of the present disclosure, the timings at which trigger signals are output to a laser apparatus 3 may be set appropriately with respect to the timings of the passage time midpoint of the droplets 271, regardless of the size of the droplets 271.

(2. Terms)

A "target" refers to a substance which is introduced into a chamber and irradiated with a laser beam. The target turns into plasma when irradiated with the laser beam and emits EUV light. A "droplet" refers to one form in which the target is supplied into the chamber. "Plasma light" is radiant light which is emitted by the target which has turned into plasma. This radiant light includes EUV light.

[3. Overview of EUV Light Generating System]

[3.1 Configuration]

FIG. 1 is a diagram that schematically illustrates the configuration of an exemplary EUV light generating system of the LPP type. An EUV light generating apparatus 1 may be employed with at least one laser apparatus 3. In the present disclosure, a system that includes the EUV light generating apparatus 1 and the laser apparatus 3 may be referred to as an EUV light generating system 11. As illustrated in FIG. 1 and described in detail later, the EUV light generating apparatus 1 may include a chamber 2 and a target supply unit 26. The chamber 2 may be capable of being sealed to be gastight. The target supply unit 26 may be mounted on the chamber 2 so as to penetrate through a wall of the chamber 2, for example. The material which is supplied by the target supply unit 26 as a target substance may include, but is not limited to, tin, terbium, gadolinium, lithium, xenon, or any combination of two or more of these substances.

A wall of the chamber 2 may have at least one aperture penetrating therethrough. A window 21 may be provided at the aperture. A pulsed laser beam 32 which is output from the laser apparatus 3 may be transmitted through the window 21. An EUV light collecting mirror 23 having a spheroidal reflective surface may be provided in the chamber 2, for example. The EUV light collecting mirror 23 may have a first focal point and a second focal point. The surface of the EUV light collecting mirror 23 may have a multi layered reflective film, in which molybdenum layers and silicon layers are alternately laminated, formed thereon, for example. It is preferable for the EUV light collecting mirror 23 to be provided such that the first focal point is positioned in a plasma generation region 25 and the second focal point is positioned at an intermediate focal (IF) point 292, for example. The EUV light collecting mirror 23 may have an aperture 24 formed at the center thereof, and a pulsed laser beam 33 may pass through the aperture 24.

The EUV light generating apparatus 1 may further include an EUV light generation control unit 5, a target sensor 4, etc. The target sensor 4 may have an image capturing function and may detect the presence, the trajectory, the position, the velocity, etc. of a target 27.

Further, the EUV light generating apparatus 1 may include a connecting portion 29 that enables the interior of the chamber 2 to be in communication with the interior of an exposure apparatus 6. A wall 291 having an aperture 293 formed therethrough may be provided in the connecting portion 29. The wall 291 may be provided such that the aperture 293 is positioned at the second focal point of the EUV light collecting mirror 23.

Further, the EUV light generating apparatus 1 may include a laser beam propagating direction control unit 34, a laser beam focusing mirror 22, and a target collecting unit 28 for collecting the target 27. The laser beam propagating direction controlling unit 34 may be equipped with an optical element for regulating the propagating direction of a laser beam, and an actuator for adjusting the position, orientation, etc. of the optical element.

[3.2 Operation]

Referring to FIG. 1, the pulsed laser beam 31 which is output from the laser apparatus 3 may propagate via the laser beam propagating direction control unit 34, pass through the window 21 as the pulsed laser beam 32, and then enter the chamber 2. The pulsed laser beam 32 may propagate through the chamber 2 along at least one laser beam path and be reflected by the laser beam focusing mirror 22, and at least one target 27 may be irradiated with the laser beam, which is the pulsed laser beam 33.

The target supply unit 26 may be configured to output the target 27 toward the plasma generation region 25 in the interior of the chamber 2. The target 27 may be irradiated with at least one pulse which is included in the pulsed laser beam 33. The target 27 which is irradiated with the pulsed laser beam may turn into plasma, and EUV light 251 may be emitted from the plasma along with light having other wavelengths. The EUV light 251 may be selectively reflected by the EUV light collecting mirror 23. EUV light 252 which is reflected by the EUV light collecting mirror 23 may be focused at the intermediate focal point 292, and output to the exposure apparatus 6. Note that a single target 27 may be irradiated with a plurality of pulses which are included in the pulsed laser beam 33.

The EUV light generation control unit 5 may be configured to totally control the entire EUV light generating system 11. The EUV light generation control unit 5 may be configured to process image data of the target 27 captured by the target sensor 4 or the like. In addition, the EUV light generation control unit 5 may control at least one of the timing at which the target 27 is output and the output direction of the target 27, for example. Further, the EUV light generation control unit 5 may control at least one of the output timing of the laser apparatus 3, the propagating direction of the pulsed laser beam 32, and the focal position of the pulsed laser beam 33, for example. The above items which are controlled are merely examples, and other additional items may be controlled as necessary.

[4. EUV Light Generating Apparatus including Droplet Detector]

[4.1 Configuration: Entire Apparatus]

The configuration of the EUV light generating apparatus 1 that includes the droplet detector 41 will be described with reference to FIG. 2.

Figure 2:
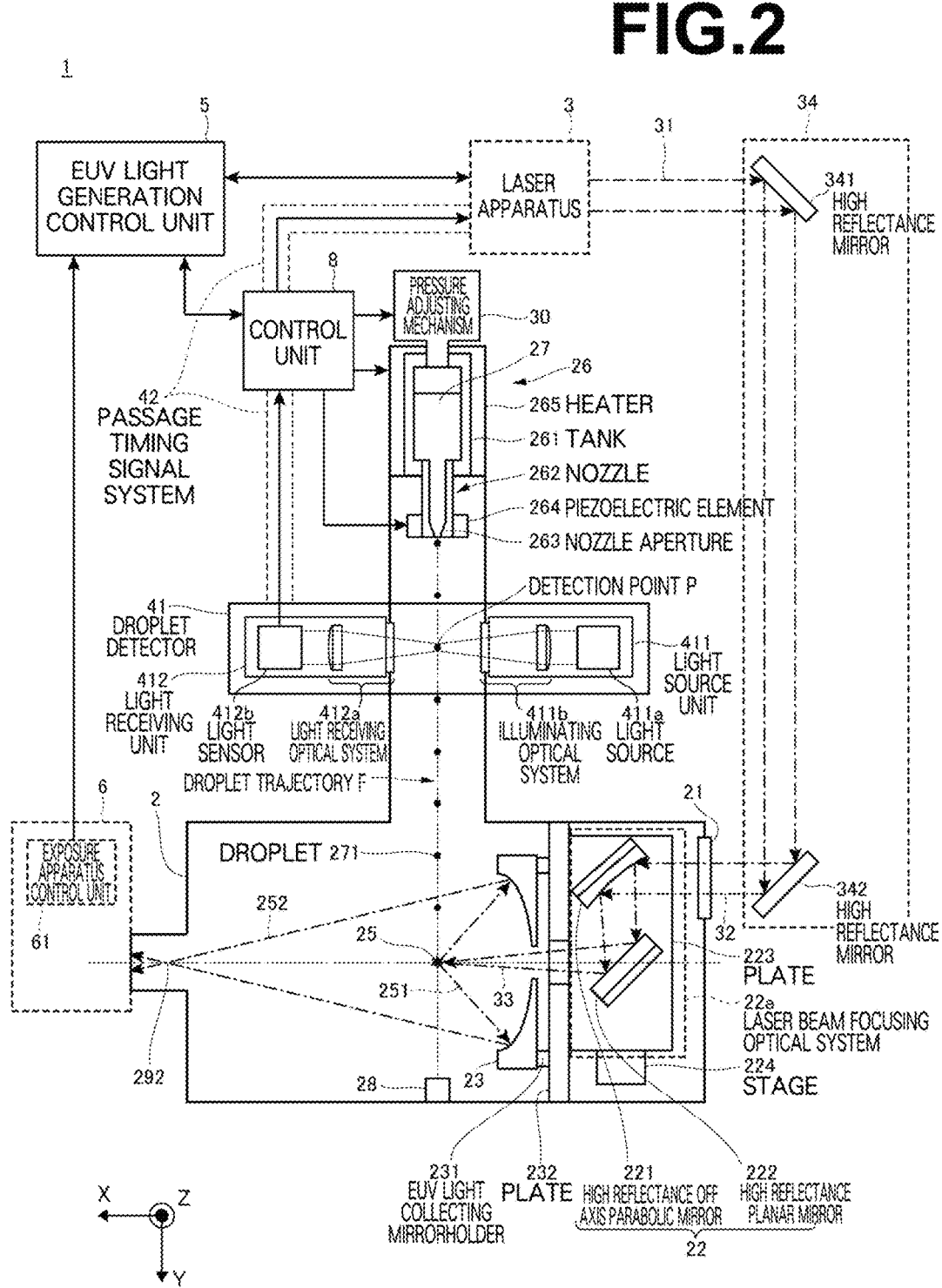
FIG. 2 is a diagram that illustrates the configuration of an EUV light generating apparatus that includes a droplet detector.

In FIG. 2, the direction in which EUV light 252 is guided from the chamber 2 of the EUV light generating apparatus 1 to the exposure apparatus 6 is designated as the X axis. The Z axis and the Y axis are axes which are perpendicular to the X axis and perpendicular to each other as well. The coordinate axes in the other drawings are the same as those of FIG. 2.

The EUV light generating apparatus 1 may include the chamber 2, the laser beam propagating direction control unit 34, the EUV light generation control unit 5, into which signals which are output from an exposure apparatus control unit 61 of the exposure apparatus are input, and a control unit 8.

The chamber 2 may include the target supply unit 26, the target sensor 4, the window 21, a laser focusing optical system 22a, a plate 223, a plate 232, an EUV light collecting mirror holder 231, the EUV light collecting mirror 23, and the target collecting unit 28.

The target supply unit 26 may include a tank 261 that stores a target substance such as liquid tin (Sn), a nozzle 262 that includes a nozzle aperture 263 that outputs the target substance, a piezoelectric element 264 provided on the nozzle 262, and a heater 265 provided on the tank 261.

A pressure adjusting mechanism 30 may adjust pressure which is applied to the target substance within the tank 261, based on control signals from the control unit 8.

The droplet detector 41 may include a light source unit 411 and a light receiving unit 412.

The light source unit 411 may include a light source 411a and an illuminating optical system 411b. The light source unit 411 may be provided such that illuminating light is radiated onto droplets 271 that travel substantially along a droplet trajectory F at a detection point P between the target supply unit 26 and the plasma generating region 25.

The illuminating optical system 411b may include a light collecting lens and a window.

The light receiving unit 412 may include a light receiving optical system 412a and a light sensor 412b. The light receiving unit 412 may be provided such that the illuminating light which is output from the light source unit 411 is input thereto at the detection point P between the target supply unit 26 and the plasma generating region 25.

The light receiving optical system 412a may include a light collecting lens and a window.

Here, a passage timing signal system 42 illustrated in FIG. 2 may be a signal transmission system related to passage timing signals, and may include the droplet detector 41, the control unit 8, the laser apparatus 3, and signal lines that connect these components. The passage timing signal system 42 will be described in detail later.

The laser beam focusing optical system 22a may include a high reflectance off axis parabolic mirror 221 and a high reflectance planar mirror 222.

The high reflectance off axis parabolic mirror 221 and the high reflectance planar mirror 222 may be provided on the plate 223 which is capable of being moved by a stage 224.

The EUV light collecting mirror 23 may be provided on the plate 232 within the chamber 2 via the EUV light collecting mirror holder 231.

The laser beam propagating direction control unit 34 may include high reflectance mirrors 341 and 342 that cause the laser beam 31 which is output from the laser apparatus 3 to propagate toward the chamber 2.

[4.2 Operation: Entire Apparatus]

Items of control which are exerted by the control unit 8 provided in the EUV light generating apparatus 1 will be described with reference to FIG. 3.

Figure 3:
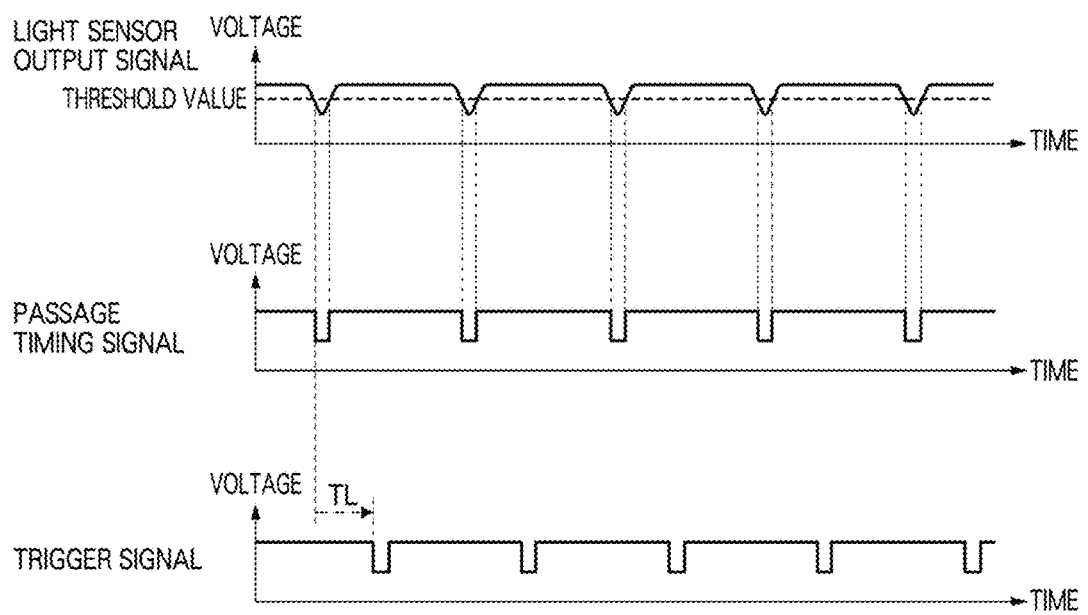
FIG. 3 illustrates a time chart related to input of passage timing signals into and output of trigger signals from a control unit illustrated in FIG. 2.

In connection with the items of control which are exerted by the control unit 8 illustrated in FIG. 3, descriptions of controls and operations which are the same as those of the EUV light generating apparatus 1 illustrated in FIG. 1 and FIG. 2 will be omitted.

FIG. 3 illustrates a time chart related to items of control which are exerted by the control unit 8 illustrated in FIG. 2. FIG. 3 illustrates a time chart for a case in which trigger signals for causing the pulsed laser beam 31 to be output are output based on detection of droplets 271 by the droplet detector 41.

First, droplet generation signals which are output by the EUV light generation control unit 5 may be input into the control unit 8. The control unit 8 may output control signals to the heater 265 such that the temperature of the target substance within the tank 261 of the target supply unit 26 is at a temperature within a range from 250° C. to 290° C., which is greater than 232° C., the melting point of the target substance.

The control unit 8 may output control signals to the pressure adjusting mechanism 30 that adjusts the pressure within the tank 261, such that the target substance within the tank 261 is output from the nozzle aperture 263 as a jet at a predetermined velocity.

Next, the control unit 8 may output signals to supply a voltage of a predetermined waveform to the piezoelectric element 261, such that the target substance is output from the nozzle aperture 263 as droplets.

As a result, the nozzle aperture 263 will vibrate due to the operation of the piezoelectric element 264 according to the voltage signal of the predetermined waveform.

The target supply unit 26 may output the target substance as droplets due to the vibration of the nozzle aperture 263.

Here, the illuminating light which is output from the light source unit 411 toward the droplets 271 may be received by the light sensor 412b of the light receiving unit 412.

For this reason, the intensity of light which is received by the light sensor 412b may decrease by the droplets 271 passing through the detection point P, as illustrated by the light sensor output signal in FIG. 3.

The light receiving unit 412 may generate passage timing signals based on the light sensor output signals which are based on the changes in light intensity, at timings at which the light sensor output signals become less than a voltage value which is a threshold value, as illustrated in FIG. 3. The light receiving unit 412 may output the generated passage timing signals to the control unit 8.

The control unit 8 may output trigger signals that cause the pulsed laser beam 31 to be output to the laser apparatus, after a predetermined amount of delay time TL elapse from input of the passage timing signals, as illustrated in FIG. 3.

The laser apparatus 3 may output the pulsed laser beam 31 when the trigger signals are input.

The pulsed laser beam 31 may enter the interior of the chamber 2 via the laser beam propagating direction control unit 34 and the window 21. The pulsed laser beam 31 may be focused by the laser beam focusing optical system 22a, and the droplets 271 which have reached the plasma generating region 25 may be irradiated therewith.

[4.3 Configuration: Droplet Detector and Passage Timing Signal System]

The configuration of the passage timing signal system 42 provided in the EUV light generating apparatus 1 will be described with reference to FIG. 4.

Figure 4:
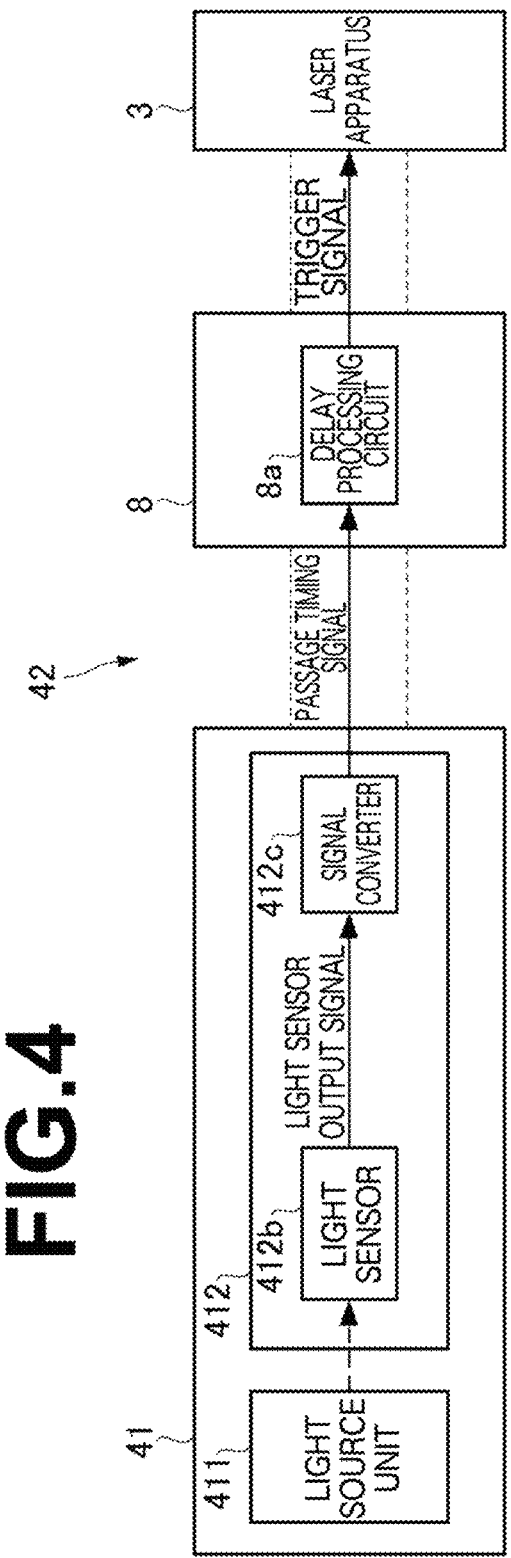
FIG. 4 is a diagram for explaining the configuration of a passage timing signal system provided in the EUV light generating apparatus illustrated in FIG. 2.

Descriptions of configurations of the passage timing signal system 42 illustrated in FIG. 4 which are the same as those of the passage timing signal system 42 illustrated in FIG. 2 will be omitted.

As illustrated in FIG. 4, the passage timing signal system may include the droplet detector 41, the control unit 8, the laser apparatus 3, and communication lines that connect these components such that they are capable of communicating with each other.

The light receiving unit 412 of the droplet detector 41 may include a signal converter 412c, into which light sensor output signals from the light sensor 412b are input.

The light sensor output signals may be analog voltage signals.

The signal converter 412c may output passage timing signals, which are generated based on the input light sensor output signals, to the control unit 8.

The control unit 8 may include a delay processing circuit 8a for imparting a predetermined amount of time as delay to timings at which the passage timing signals are input, and then outputting trigger signals to the laser apparatus 3.

[4.4 Operation: Droplet Detector and Passage Timing Signal System]

Specific items of control which are exerted by the control unit 8 related to the operations of the droplet detector 41 and the passage timing signal system 42 will be described with reference to FIG. 5 through FIG. 7.

Figure 5:
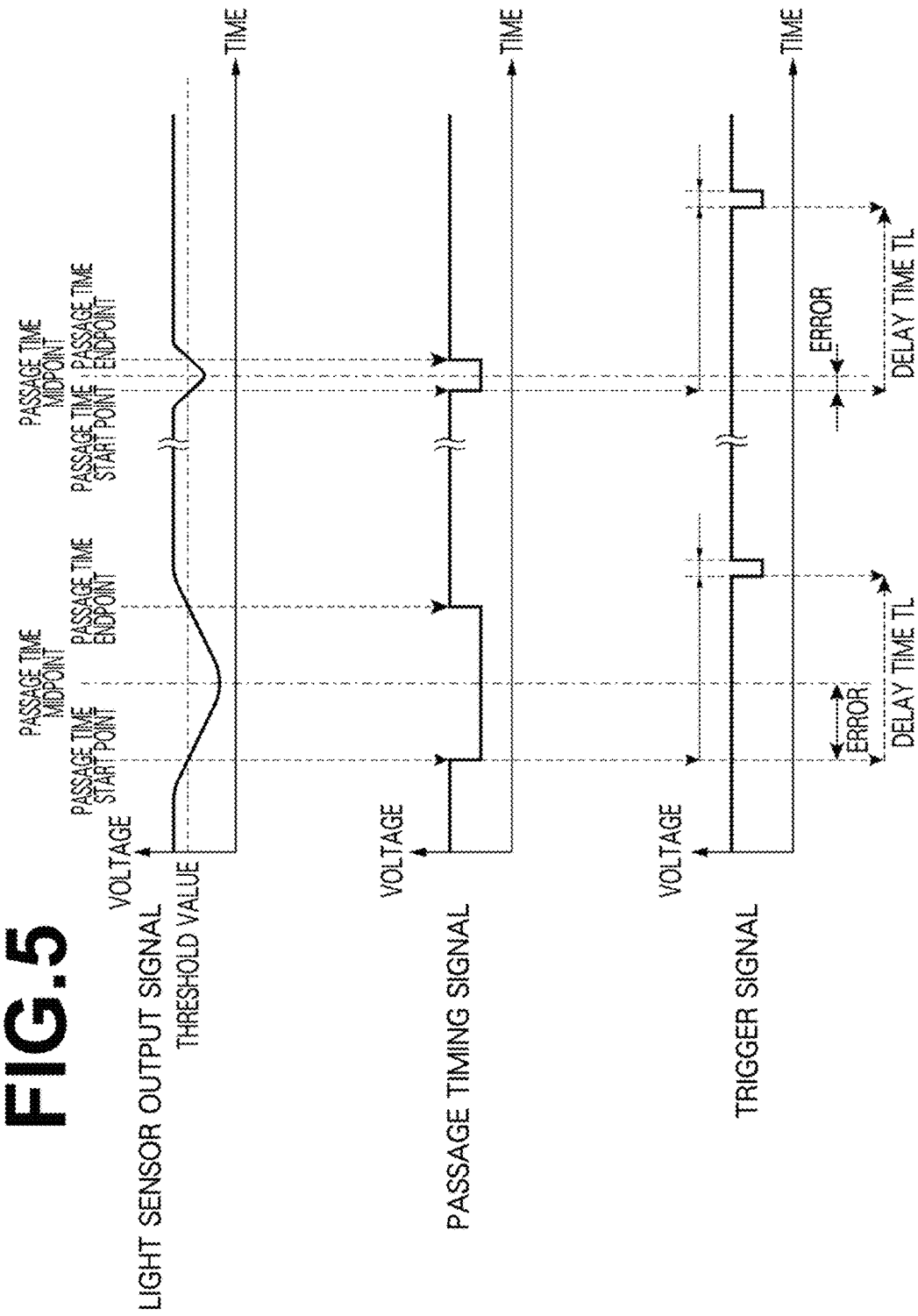
FIG. 5 illustrates a time chart related to input of passage timing signals into and output of trigger signals from a control unit illustrated in FIG. 4.
Figure 6:
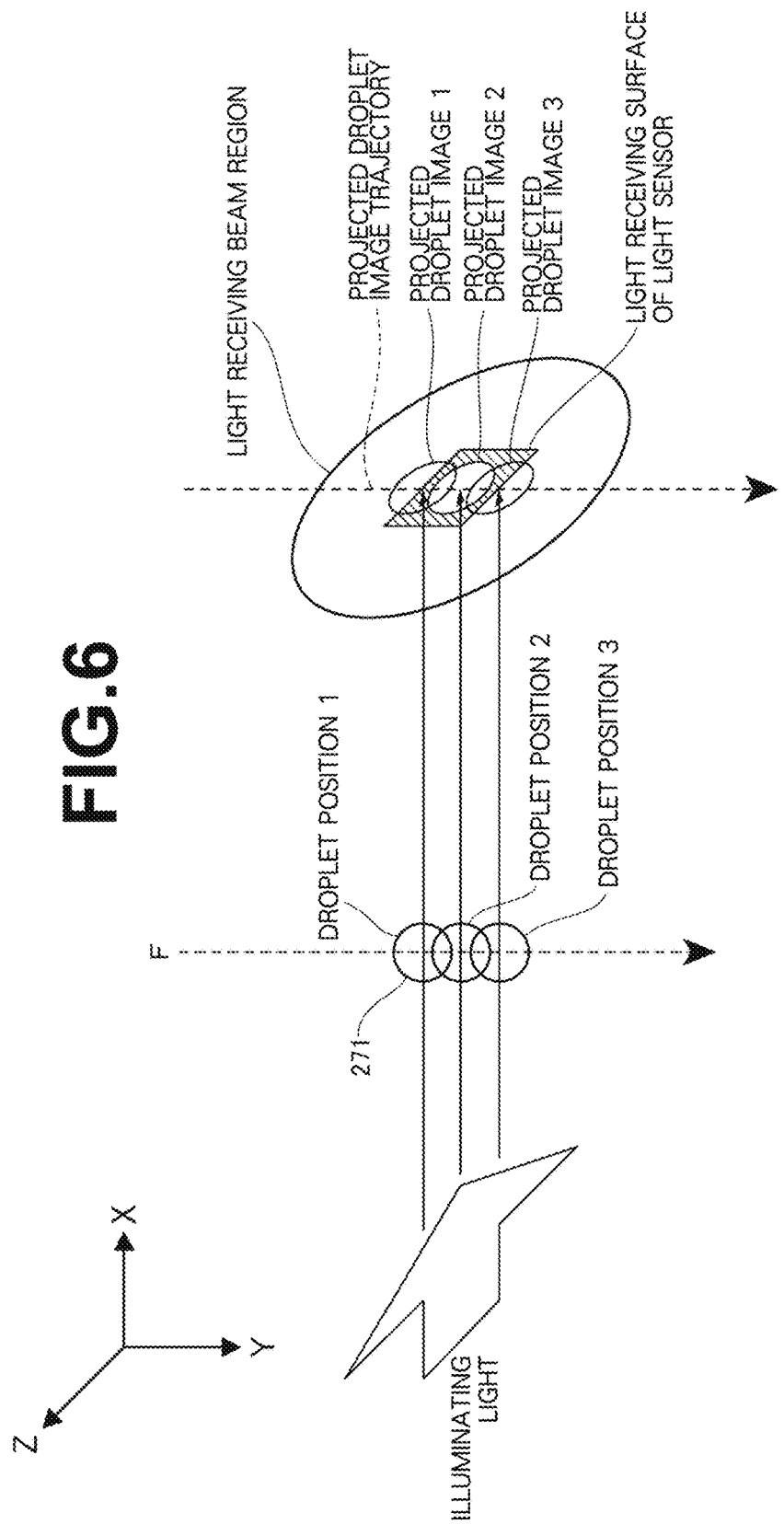
FIG. 6 illustrates an example of a projected image of a droplet at a light receiving surface of a light sensor of the droplet detector illustrated in FIG. 2 and FIG. 4.
Figure 7:
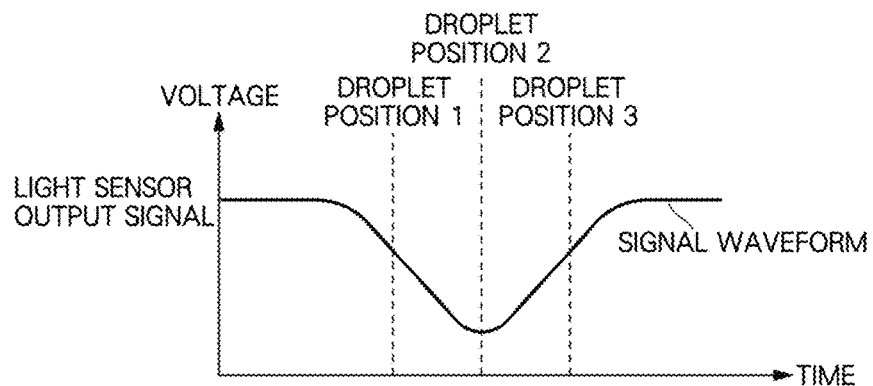
FIG. 7 illustrates an example of an output signal from the light sensor based on the projected image of the droplet illustrated in FIG. 6.

Among the items of control which are exerted by the control unit 8 illustrated in FIG. 5 through FIG. 7, descriptions of items of control and operations which are the same as those of the EUV light generating apparatus 1 illustrated in FIG. 2 and FIG. 3 will be omitted.

FIG. 5 illustrates a time chart related to input of passage timing signals into and output of trigger signals from the control unit 8 illustrated in FIG. 4. The time chart of FIG. 5 is that for a case in which trigger signals that cause the pulsed laser beam 31 to be output are output to the laser apparatus 3, based on the input of passage timing signals from the droplet detector 41.

The light sensor output signals may become lower, by the illuminating light from the light source unit 411 being shielded due to the droplets 271 passing through the detection point P, as illustrated in FIG. 5.

The signal converter 412c may amplify the light sensor output signals. The signal converter 412c may convert the light sensor output signals into binarized signals, based on a threshold value which is set in advance. The signal converter 412c may generate the passage timing signals as digital signals, by binarizing the light sensor output signals.

The control unit 8 may generate the trigger signals at timings after an amount of delay time TL has elapsed from the timings at which the passage timing signals are input.

The control unit 8 may vary the width of the generated trigger signals as appropriate. The control unit 8 may output the generated trigger signals to the laser apparatus 3. The control unit 8 may delay the timings at which the trigger signals are output as appropriate.

Here, the percentage of the area of a light receiving surface of the light sensor 412b which is occupied by projected images of the droplets 271 which are projected onto the light receiving surface of the light sensor 412b may change corresponding to the progression of the droplets 271 substantially along the droplet trajectory F.

For this reason, the signal waveforms represented by the light sensor output signals may change into waveforms that reflect the shapes of the droplets 271 or the light receiving surface, corresponding to the change in the percentage of the area of the light receiving surface of the light sensor which is occupied by the projected images of the droplets 271, as illustrated in FIG. 7.

[5. Problem]

Here, there may be cases in which the droplet trajectory F along which the droplets 271 progress changes in the direction of the Z axis.

Figure 8:
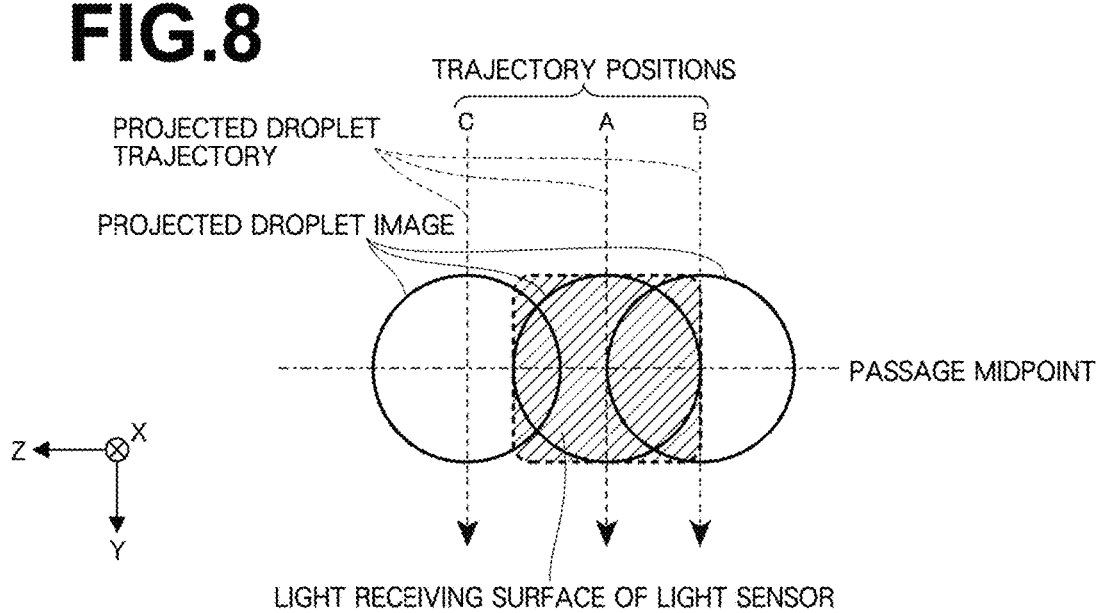
FIG. 8 illustrates an example of a projected image of a droplet at the light receiving surface of the light sensor of the droplet detector illustrated in FIG. 2 and FIG. 4.

The position of the trajectory of the projected images of droplets which are projected onto the light receiving surface of the light sensor 412 may change with respect to the light receiving surface due to the change in the droplet trajectory F in the direction of the Z axis, as illustrated in FIG. 8.

Figure 9:
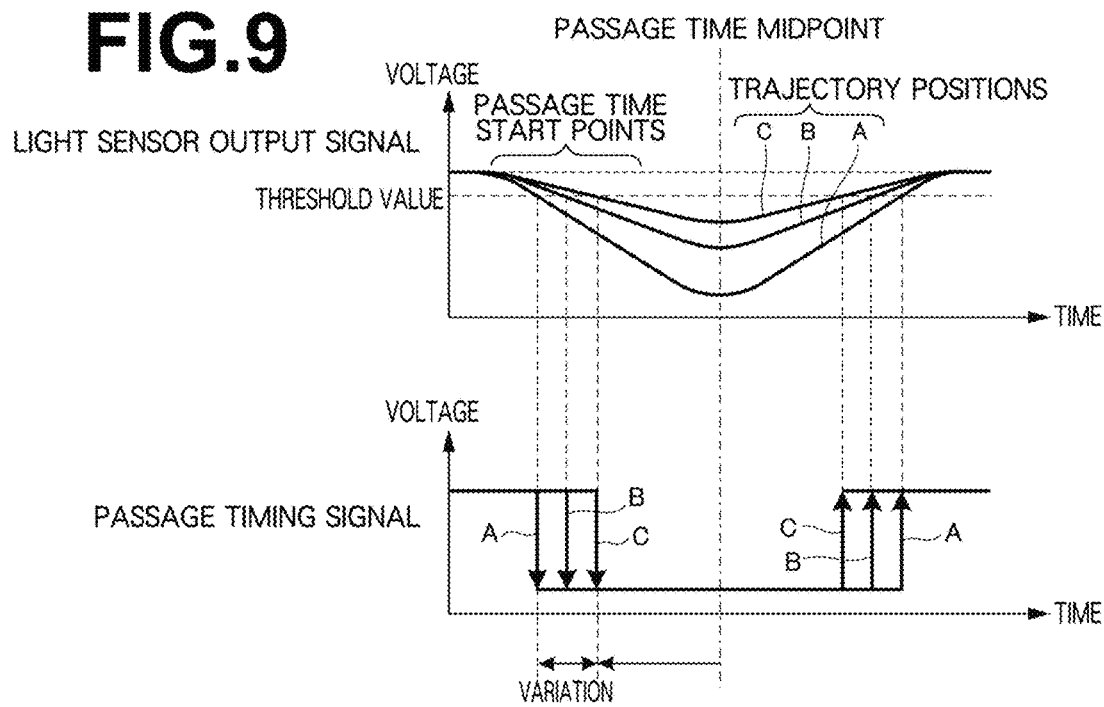
FIG. 9 illustrates an example of an output signal from the light sensor based on the projected image of the droplet illustrated in FIG. 8.

Generally, the percentage of the area of a light receiving surface of the light sensor 412b which is occupied by projected images of the droplets 271 transitions while reflecting the shapes of the droplets 271 and the light receiving surface corresponding to the progression of the droplets 271 substantially along the droplet trajectory F, as illustrated in FIG. 9.

However, the percentage of the area of a light receiving surface of the light sensor 412b which is occupied by projected images of the droplets 271 may change by the position of the trajectory of the projected images of the droplets changing with respect to the light receiving surface of the light sensor 412b, as illustrated in FIG. 9.

By the percentage of the area of a light receiving surface of the light sensor 412b which is occupied by projected images of the droplets 271 changing, the extreme values of the signal waveforms represented by the light sensor output signals may change, as illustrated in FIG. 9.

By the extreme values of the signal waveforms represented by the light sensor output signals, the width of the passage timing signals which are obtained employing the predetermined threshold value with respect to the signal waveforms may change, as illustrated in FIG. 9.

In addition, there may be cases in which the diameters of the droplets 271 which are output from the target supply unit 26 change.

Alternatively, there may be cases in which the droplet trajectory F, along which the droplets 271 progress, changes in the direction of the X axis.

Figure 10:
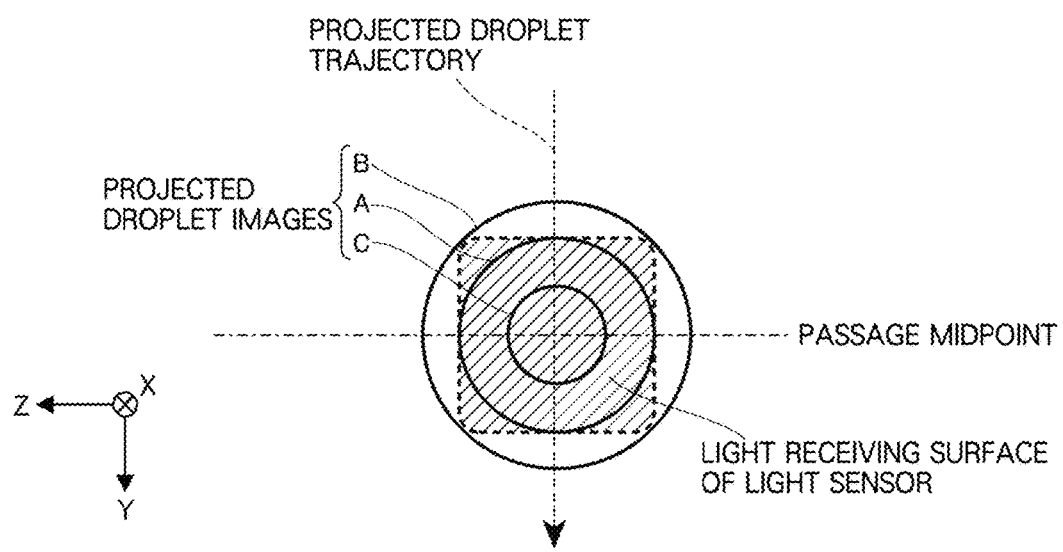
FIG. 10 illustrates an example of a projected image of a droplet at the light receiving surface of the light sensor of the droplet detector illustrated in FIG. 2 and FIG. 4.

The changes in the diameters of the droplets and the changes in the droplet trajectory F in the direction of the X axis may cause the diameters of the projected images of the droplets on the light receiving surface of the light sensor 412b to change, as illustrated in FIG. 10.

By the diameters of the projected images of the droplets on the light receiving surface of the light sensor 412b changing, the percentages of the area of the light receiving surface of the light sensor 412b occupied by the projected images of the droplets may change.

Figure 11:
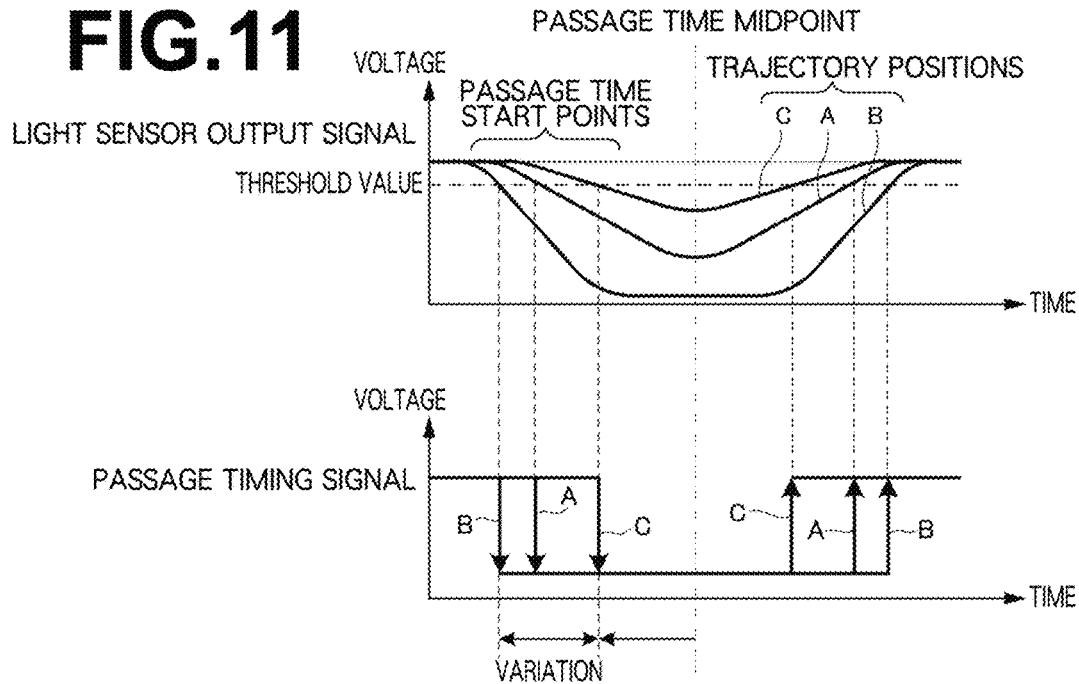
FIG. 11 illustrates examples of output signals from the light sensor based on the projected image of the droplet illustrated in FIG. 10.
Figure 12:
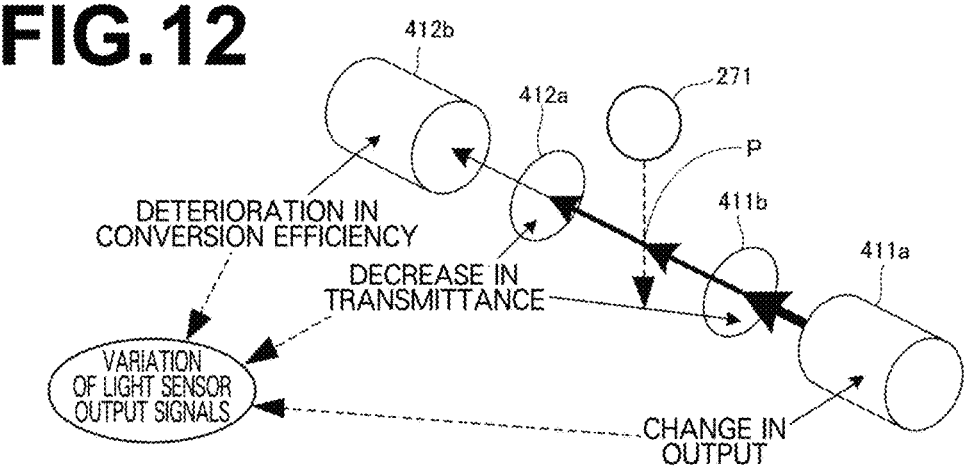
FIG. 12 illustrates an example of changes in light intensities from output of illuminating light from a light source of the droplet detector illustrated in FIG. 2 and FIG. 4 until the illuminating light is input to the light sensor.
Figure 13:
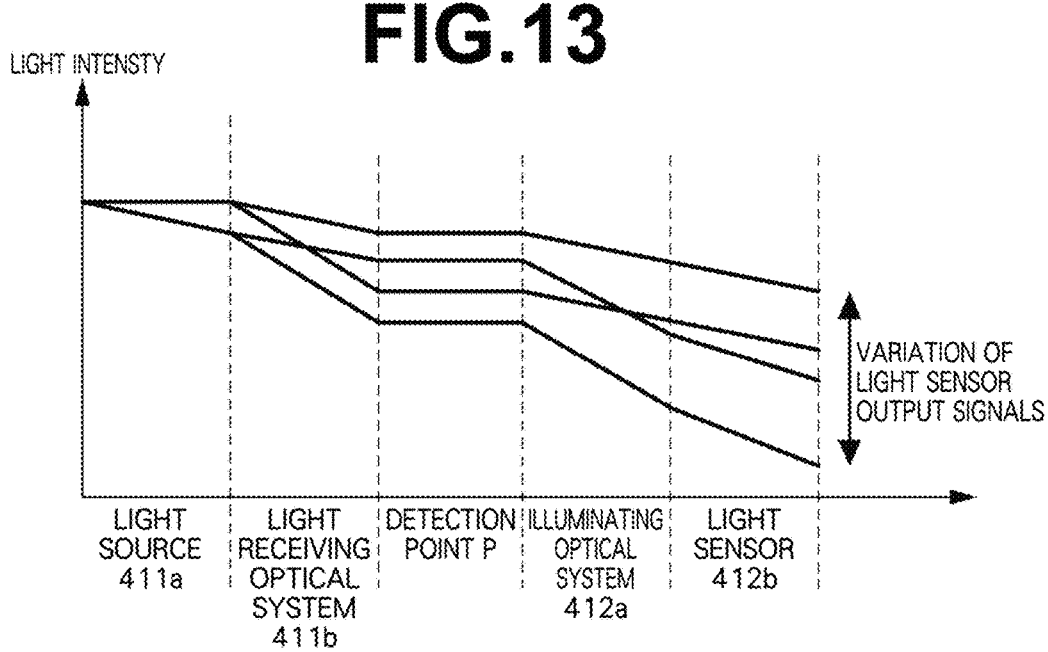
FIG. 13 illustrates an example of changes in light intensities at the droplet detector illustrated in FIG. 12.

By the percentages of the area of the light receiving surface of the light sensor 412b occupied by the projected images of the droplets changing, the extreme values and the widths of the signal waveforms represented by the light sensor output signals may change, as illustrated in FIG. 11.

By the values and the widths of the signal waveforms represented by the light sensor output signals changing, the widths of the passage timing signals which are obtained by employing a constant threshold value with respect to the signal waveforms may change, as illustrated in FIG. 11.

Further, other factors may occur in the droplet detector 41, such as fluctuations in the output of the light source 41a, decreases in the transmissivities of the illuminating optical system 411b and the light receiving optical system 412a, and deterioration in the conversion efficiency of output signals from the light sensor 412, may also occur in the droplet detector 41.

Figure 14:
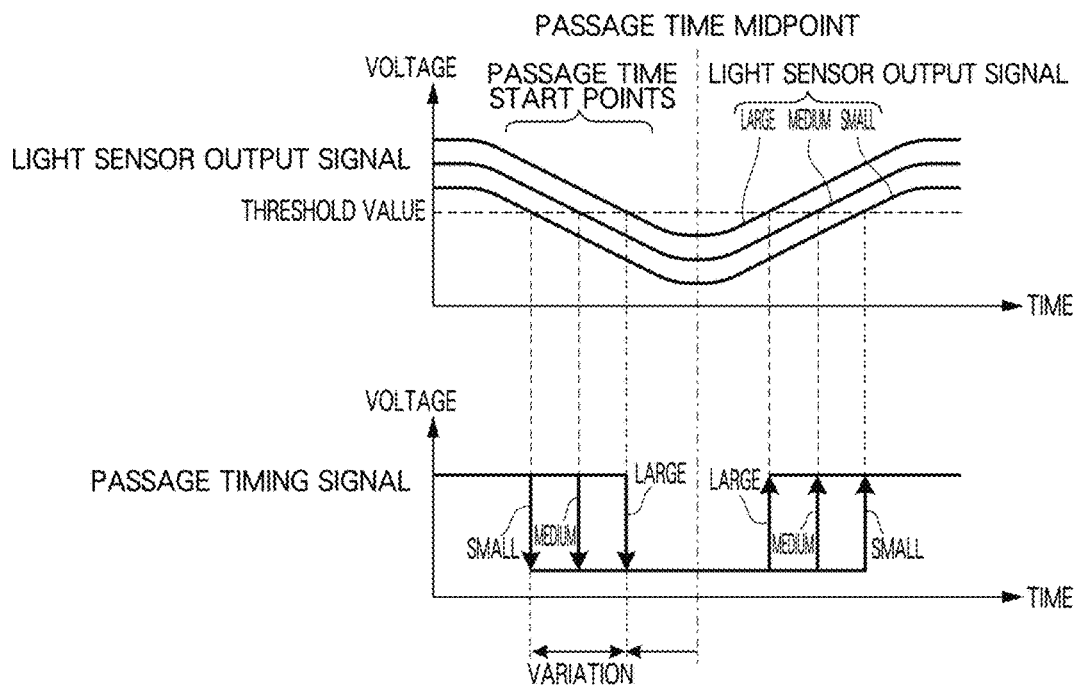
FIG. 14 illustrates examples of light sensor output signals based on the changes in light intensities at the droplet detector illustrated in FIG. 12 and FIG. 13.

By the light sensor output signals from the light sensor 412b decreasing, the extreme values of the signal waveforms represented by the light sensor output signals may change, as illustrated in FIG. 14.

By the extreme values of the signal waveforms represented by the light sensor output signals changing, the widths of the passage timing signals which are obtained by employing a constant threshold value with respect to the signal waveforms may change, as illustrated in FIG. 14.

The velocity of the droplets 271 which are output from the target supply unit 26 may be set arbitrarily.

Alternatively, there may be cases in which the velocity of the droplets 271 which are output from the target supply unit 26 varies.

In the case that the velocity of the droplets 271 varies, the shapes of the signal waveforms of the light sensor output signals illustrated in FIG. 9, FIG. 11, and FIG. 14 may change.

By the shapes of the signal waveforms of the light sensor output signals changing, the widths of the passage timing signals which are obtained by employing a constant threshold value with respect to the signal waveforms may change.

The widths of the generated passage timing signals may vary due to each of the factors described above.

More specifically, when a plurality of droplets 271 are designated as targets of comparison as illustrated in FIG. 5, the passage time start points of each of the droplets 271 will vary with respect to the passage time midpoints of the droplets 271.

That is, the timings at which the signal waveform of the light sensor output signal will become less than the threshold value will vary with respect to the passage time midpoints of the droplets 271.

Here, the passage time midpoint may be the timing at a point in time in the middle between a passage time start point and a passage time endpoint, and may be the same for all of the droplets 271.

As described with reference to FIG. 3, the control unit 8 may output trigger signals to the laser apparatus 3 at timings after an amount of delay time TL has elapsed from the timings at which the passage timing signals are generated.

However, the timings at which the signal waveform of the light sensor output signal becomes less than the threshold value may change with respect to the passage midpoint time for each droplet 271, as illustrated in FIG. 5.

For this reason, cases may occur in which the timings at which the droplets 271 reach the plasma generating region and the timings at which the pulsed laser beam 33 is output do not match.

In this case, the pulsed laser beam 33 cannot be accurately focused on the droplets 271 which have reached the plasma generating region 25 and the droplets 271 cannot be irradiated with the pulsed laser beam 33 within the plasma generating region 25.

As a result, the light emitting efficiency of the EUV light 251 which is generated by the droplets 271 being irradiated with the pulsed laser beam 33 may deteriorate or change.

In view of the above problems, it is necessary for the passage time midpoint of the droplets 271 to be accurately detected, in order to accurately detect passage of the droplets 271 at the detection point P.

However, it has been difficult to specify the passage time midpoint from only the passage timing signals, which are generated at timings at which the signal waveform of the light sensor output becomes less than the threshold value.

[6. EUV Light Generating Apparatus Equipped with Timing Determining Circuit According to First Embodiment
[6.1 Configuration: Entire Apparatus]

The configuration of a timing determining circuit 70 provided in an EUV light generating apparatus 1 according to a first embodiment will be described with reference to FIG. 15.

Figure 15:
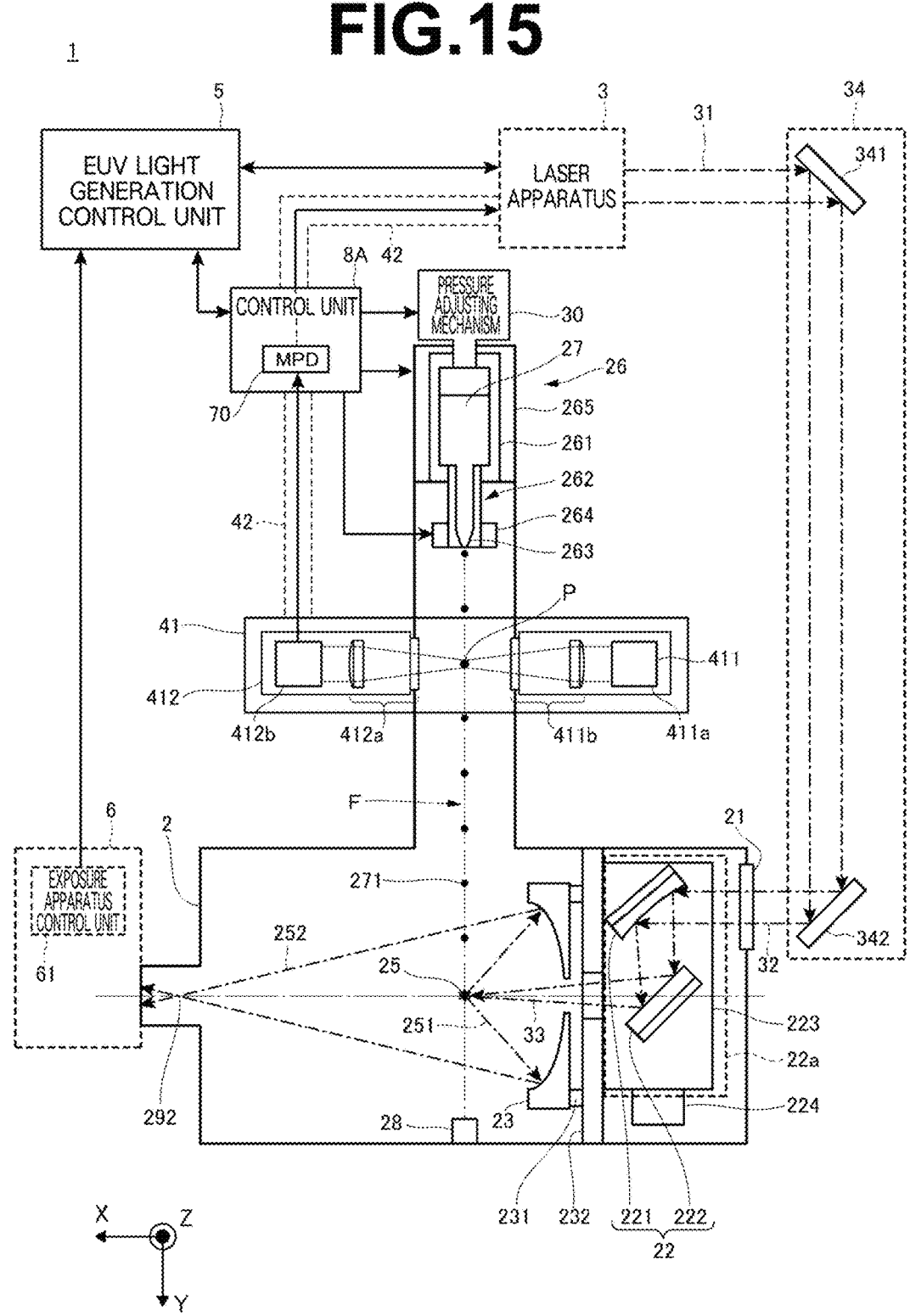
FIG. 15 is a diagram for explaining the configuration of an EUV light generating apparatus equipped with a timing determining circuit according to a first embodiment.

Here, FIG. 15 is a diagram for explaining the configuration of the EUV light generating apparatus 1 equipped with the timing determining circuit 70.

The EUV light generating apparatus 1 of the first embodiment may differ from the EUV light generating apparatus 1 illustrated in FIG. 2 in that it is provided with the timing determining circuit 70.

According to the EUV light generating apparatus 1 of the first embodiment, the passage time midpoint of the droplets 271 may be calculated appropriately, by the timing determining circuit 70 being provided.

For this reason, the timings at which trigger signals are output to the laser apparatus 3 may be set appropriately, regardless of the size of the droplets 271.

The other configurations of the EUV light generating apparatus 1 of the first embodiment may be the same as the configurations of the EUV light generating apparatus 1 illustrated in FIG. 2.

With respect to the configurations of the EUV light generating apparatus 1 of the first embodiment, descriptions of those which are the same as the configurations of the EUV light generating apparatus 1 illustrated in FIG. 2 will be omitted.

The timing determining circuit 70 may be provided within a control unit 8A< as illustrated in FIG. 15.

Alternatively, the timing determining circuit 70 may be provided at any position between the droplet detector 41 and the control unit 8A within the passage timing signal system 42.

Here, the timing determining circuit 70 may perform a passage time midpoint calculating process to be described later, that calculates the passage time midpoints described with reference to FIG. 5 based on passage timing signals which are output from the light sensor 412b.

The timing determining circuit 70 may perform a delay time TD calculating process to be described later, that calculates a predetermined delay time TD with respect to the calculated passage time midpoint.

Further, the timing determining circuit 70 may perform a droplet detection signal generating process that generates a droplet detection signal to be described later, after the predetermined delay time elapses from the calculated passage time midpoint.

Hereinafter, the passage time midpoint calculating process, the delay time TD calculating process, and the detection signal generating process will be collectively referred to as an MPD process (Mid Point Delay Process). In addition, the timing determining circuit 70 will be denoted as "MPD" or "MPD process" in the drawings as appropriate.

In the case that the passage time midpoint calculating process, the delay time TD calculating process, and the detection signal generating process are executed by a dedicated circuit, the timing determining circuit 70 may be provided within electronic circuitry of the light sensor 412*b*, within the passage timing signal system 42, or within electronic circuitry of the control unit 8A.

In the case that the passage time midpoint calculating process, the delay time TD calculating process, and the detection signal generating process are executed by logic functions, the timing determining circuit 70 may be provided within an integrated circuit utilized by electronic circuitry of the light sensor 412*b*, or within an integrated circuit utilized by electronic circuitry of the control unit 8A.

Hereinafter, a case in which the timing determining circuit 70 is provided within the control unit 8A will be described.

[6.2 Configuration: Droplet Detector and Passage Timing Signal System]

The configuration of the passage timing signal system 42 provided in the EUV light generating apparatus 1 of the first embodiment will be described with reference to FIG. 16A and FIG. 16B.

Here, FIG. 16A is a diagram for explaining the configuration of the passage timing signal system 42 provided in the EUV light generating apparatus 1 of the first embodiment.

Figure 16B:
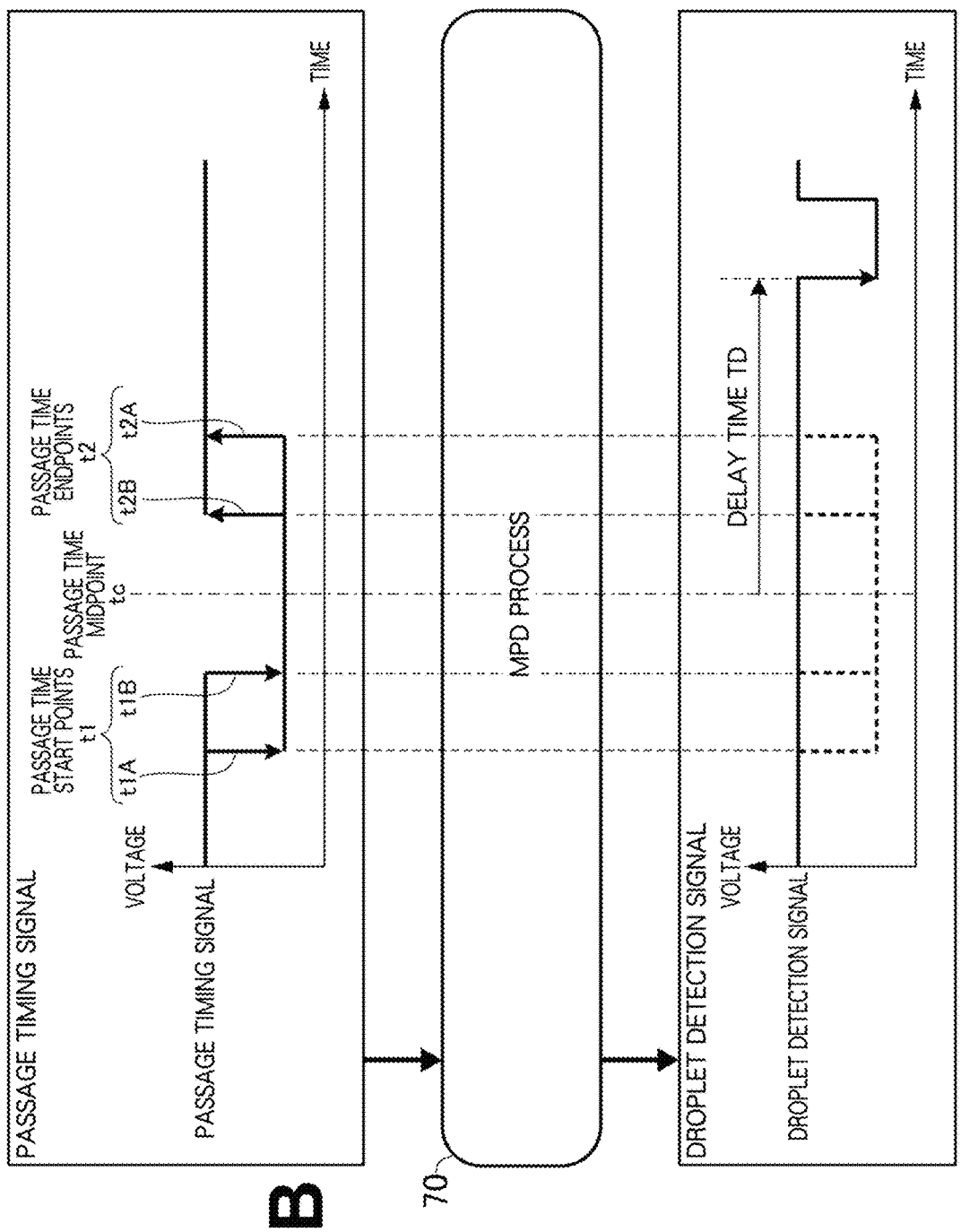
FIG. 16B is a diagram form explaining a timing determining circuit that outputs droplet detection signals based on passage timing signals which are input thereto.

FIG. 16B is a diagram form explaining a timing determining circuit that outputs droplet detection signals based on passage timing signals which are input thereto.

The control unit 8A of the first embodiment may differ from the control unit 8 illustrated in FIG. 4 in that it includes the timing determining circuit 70.

The timing determining circuit 70 may be provided at the input side of the delay processing circuit 8*a*.

The other configurations of the passage timing signal system 42 of the first embodiment may be the same as the configurations illustrated in FIG. 4.

Descriptions of the configurations of the passage timing signal system 42 of the first embodiment which are the same as the configurations illustrated in FIG. 4 will be omitted.

Passage timing signals which are output from the light receiving unit 412 of the droplet detector 41 may be input to the timing determining circuit 70, as illustrated in FIG. 16A and FIG. 16B.

The timing determining circuit 70 may perform the MPD process, which includes the passage time midpoint calculating process, the delay time TD calculating process, and the droplet detection signal generating process, based on the input passage timing signals.

The timing determining circuit 70 may output the generated droplet detection signals to the delay processing circuit 8*a*.

[6.3 Operation: Control Unit]

Items of control which are exerted by the control unit 8A provided in the EUV light generating apparatus 1 of the first embodiment will be described with reference to FIG. 17.

Figure 17:
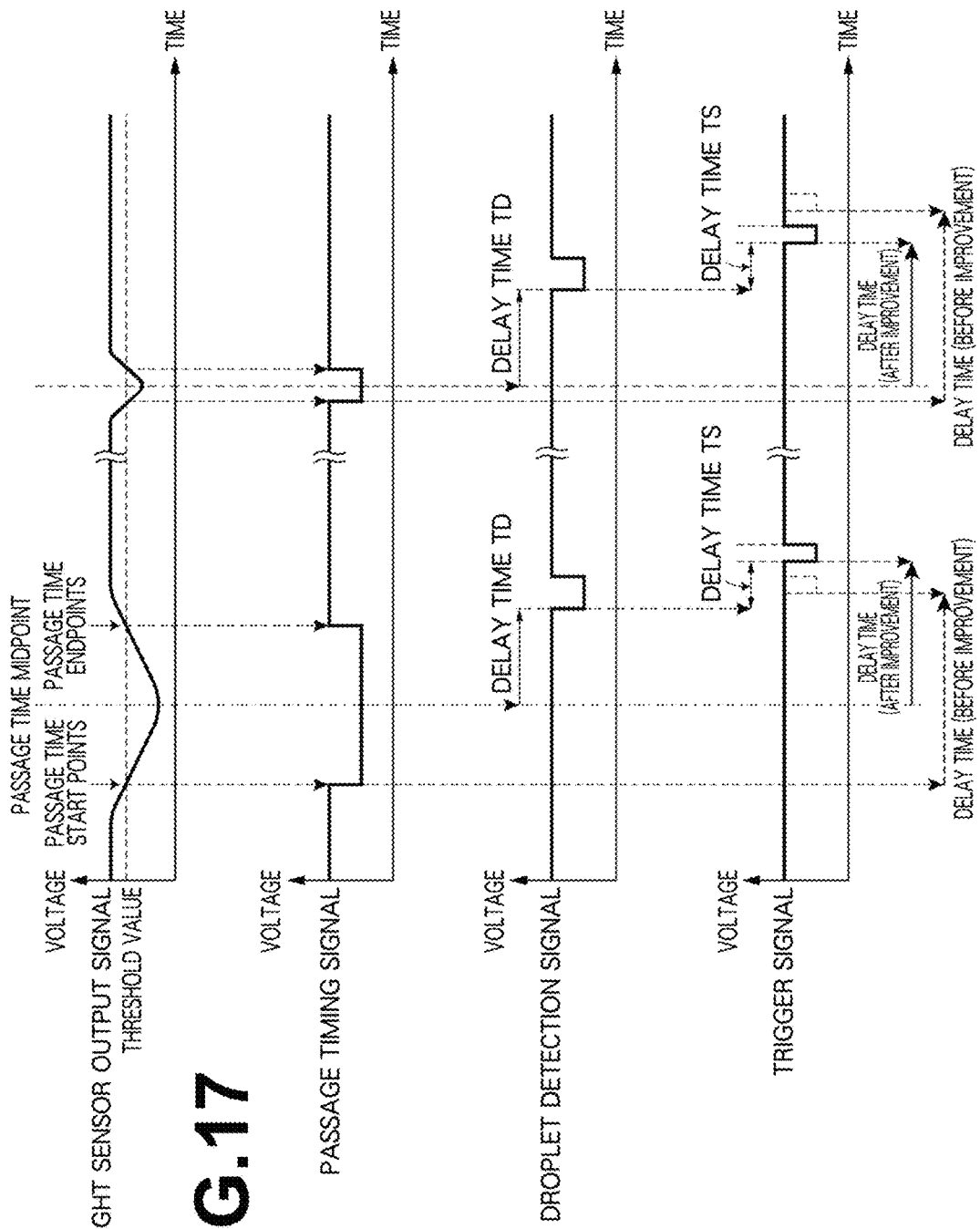
FIG. 17 illustrates a time chart related to output of trigger signals based on input of passage timing signals by a control unit of the EUV light generating apparatus of the first embodiment.

Among the items of control exerted by the control unit 8A illustrated in FIG. 17, descriptions of items of control and operations which are the same as those of the EUV light generating apparatus 1 illustrated in FIG. 3 and FIG. 5 will be omitted.

FIG. 17 illustrates a time chart related items of control which are exerted by the control unit 8A of the first embodiment, and illustrates a time chart related to output of trigger signals based on input of passage timing signals from the droplet detector 41.

Hereinafter, a timing at which the light sensor output signal from the light sensor 412*b* becomes less than a threshold value as illustrated in FIG. 17 will be referred to as a first timing. A timing at which the light sensor output signal becomes greater than the threshold value will be referred to as a second timing.

For this reason, the first timing may be recognized to be a passage time start point in the first embodiment, as illustrated in FIG. 17.

The second timing may be recognized to be a passage time endpoint, as illustrated in FIG. 17.

In addition, a timing at the midpoint between the passage time start point and the passage time endpoint will be referred to as the passage time midpoint.

The droplet detection signals to be described later, which are output from the timing determining circuit 70, may be input into the delay processing circuit 8*a* of the control unit 8.

The delay processing circuit 8*a* may generate trigger signals after a predetermined delay time TS elapses from the timings at which the droplet detection signals are input, based on the input droplet detection signals.

The droplet detection signals will become signals based on the passage time midpoints of the droplets 271 regardless of changes in the timings at which the passage timing signals are generated, as illustrated in FIG. 17.

[6.4 Operation: Timing Determining Circuit]

Control of the timing determining circuit 70 provided in the control unit 8A of the first embodiment will be described with reference to FIG. 18.

Figure 18:
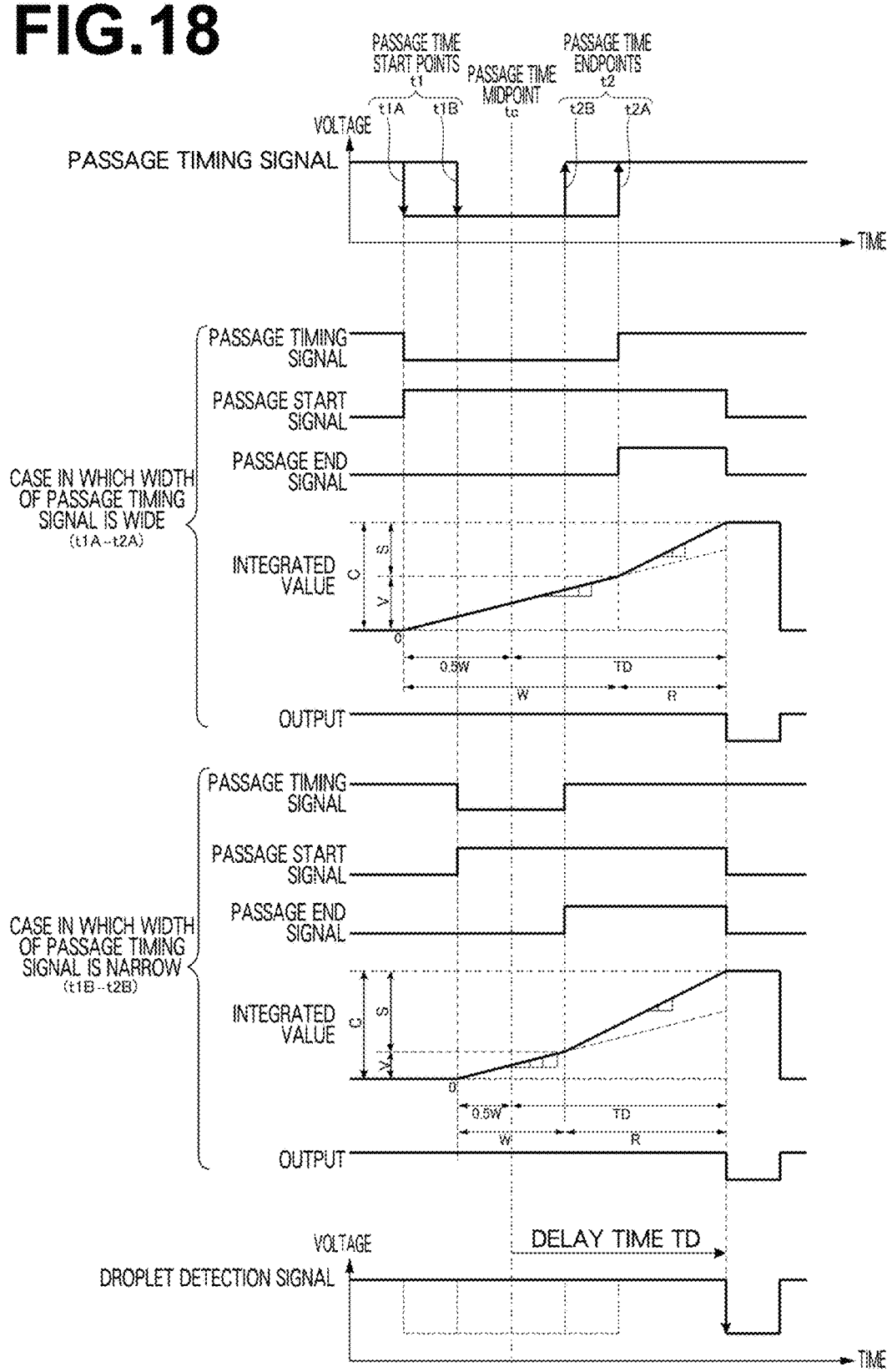
FIG. 18 illustrates a time chart related to generation of droplet detection signals within a delay processing circuit of the control unit of the first embodiment.

FIG. 18 illustrates a time chart related to control of the timing determining circuit 70 of the control unit 8A of the first embodiment, and illustrates a time chart related to generation of droplet detection signals based on input passage timing signals.

[6.4.1 Operation: Passage Time Midpoint Calculating Process]

Here, the passage time midpoint calculation process performed by the timing determining circuit 70 will be described with reference to FIG. 18.

Passage timing signals may be input to the timing determining circuit 70 from the droplet detector 41. The timing determining circuit 70 may generate passage start signals and passage end signals based on the input passage timing signals.

The timing determining circuit 70 may specify a passage start time (t1) and a passage end time (t2) based on the generated passage start signal and the generated passage end signal.

The timing determining circuit 70 may specify half the amount of time (0.5W) of an amount of time (W) from the passage start time (t1) to the passage end time (t2) as the passage time midpoint (tc) of the droplet 271.

[6.4.2 Operation: Delay Time TD Calculating Process]

The timing determining circuit 70 may perform a first integrating process that integrates a constant value at a constant speed with respect to the amount of time from the passage start time (t1) to the passage end time (t2).

That is, the first integrating process may be a process that integrates a predetermined value per unit time.

The predetermined value, which is a constant value, may be stored in a memory within the control unit 8A. Alternatively, the predetermined value, which is a constant value, may be input to the control unit 8A via a network or the like. The predetermined value, which is a constant value, may also be manually input to the control unit 8A by an operator or the like.

More specifically, the timing determining circuit 70 may integrate may integrate the constant value at the constant speed for the amount of time (W) from the passage time start point (t1) to the passage time endpoint (t2), to calculate a first integrated value (V).

The relational formula below may be established, for example, as a linear function as illustrated in FIG. 18.

$$V=W \quad \text{(Formula 1)}$$

Next, the timing determining circuit 70 may perform a second integrating process that integrates a value which is twice the value obtained by the first integrating process, at the same constant speed as that of the first integrating process, for an amount of time following the specified passage time endpoint.

That is, the second integrating process may be a process that integrates a value, which is twice the predetermined value of the first integrating process, per unit time.

More specifically, the timing determining circuit 70 may calculate a second integrated value (S), which is twice the value of the first integrating process, for an amount of time (R) after the passage time endpoint (t2), as illustrated in FIG. 18.

In accordance with the example of Formula 1, the relational formula below may be established as a linear function as illustrated in FIG. 18.

$$S=2R \quad \text{(Formula 2)}$$

The timing determining circuit 70 may calculate a sum of the first integrated value (V) which is calculated by the first integrating process and the second integrated value (S) which is calculated by the second integrating process, to obtain a total integrated value (C).

The timing determining circuit 70 may perform the second integrating process after performing the first integrating process.

The timing determining circuit 70 may continue calculation of the second integrated value (S) by the second integrating process, while continuing the total integrated value (C) as indicated below as a relational formula (Formula 3).

$$C=V+S \quad \text{(Formula 3)}$$

The timing determining circuit 70 may calculate the second integrated value (S) until the calculated total integrated value (C) exceeds a predetermined reference value which is set in advance.

Here, the predetermined reference value may be stored in the memory within the control unit 8A. Alternatively, the predetermined reference value may be input to the control unit 8A via a network or the like. As a further alternative, the predetermined reference value may also be manually input to the control unit 8A by an operator or the like.

The timing determining circuit 70 may specify the length of time after the passage time endpoint (t2) at a point in time when the total integrated value (C) exceeds the predetermined reference value.

Specifically, the amount of time (R) after the passage time endpoint (t2) may be specified, as illustrated in FIG. 18.

Here, the relational formula below may be established between the amount of time (W) from the passage time start point (t1) to the passage time endpoint (t2) and the amount of time (R) after the passage time endpoint (t2).

$$W+R=0.5W+TD \quad \text{(Formula 4)}$$

That is, the amount of time (TD) from the passage time midpoint (tc) to the point in time at which it is determined that the total integrated value (C) has exceeded the predetermined reference value can be specified.

Further, the relational formula below may be established based on the relational formula above (Formula 4).

$$TD=0.5W+R \quad \text{(Formula 5)}$$

In addition, the relational formula below may be established on Formula 1, Formula 2, Formula 3, and Formula 5 above.

$$C=V+S=W+2R=2 \cdot (0.5+R)=2TD \quad \text{(Formula 6)}$$

The relational formula below may be constantly established based on the relational formula above (Formula 6).

$$C=2TD \quad \text{(Formula 7)}$$

For this reason, if the predetermined reference value for the total integrated value (C) is set to a constant value, the amount of time (TD) will also be a constant value.

The timing determining circuit 70 may specify the calculated amount of time (TD) as the delay time TD illustrated in FIG. 17.

The timing determining circuit 70 may store the calculated delay time TD in the memory within the control unit 8A or the like.

[6.4.3 Operation: Droplet Detection Signal Generating Process]

The timing determining circuit 70 may specify a timing, which is a point in time at which 0.5W has elapsed form the passage time start point (t1) and then the delay time (TD) has further elapsed.

Accordingly, the timing determining circuit 70 may generate a droplet detection signal after the predetermined delay time TD, which corresponds to the delay time (TD), has elapsed from the passage time midpoint (tc) of the droplet 271, based on the specified delay time (TD).

Here, the timing determining circuit 70 may generate the droplet detection signal at the timing at which it is determined that the total integrated value (C) has exceeded the predetermined reference value, as illustrated in FIG. 18.

When generating the droplet detection signals, the timing determining circuit 70 may generate the droplet detection signal after the delay time TD elapses, based on the delay time TD which is stored in the memory within the control unit 8A or the like, without performing the delay time TD calculating process.

Here, the delay time TD is half (0.5W) the amount of time (W) from the passage time start point (t1) to the passage time endpoint (t2). Therefore, the delay time will always be a constant amount of time (TD) regardless of the size of the width of the input passage timing signals, as illustrated in FIG. 18.

For this reason, the droplet detection signals will always be generated after a constant amount of time (TD) elapses with respect to the passage time midpoints (tc) of the droplets 271, without being influenced by the sizes of the droplets 271 that pass the detection point P.

The passage time midpoint calculating process, the delay time TD calculating process, and the droplet detection signal generating process performed by the timing determining circuit 70 may exhibit the same advantageous results as those described above, even in the case that the passage timing signals from the light receiving unit 412 are input with their positive/negative signs inverted.

In addition, the same advantageous results as those described above may be exhibited even in the case that the droplet detection signals which are generated by the timing determining circuit 70 are output with their positive/negative signs inverted.

[6.4.4 Other: Specific Examples of Delay Time TD]

Hereinafter, specific examples of the delay time TD which is calculated and set by the timing determining circuit 70 will be described with reference to FIG. 19A and FIG. 19B.

FIG. 19A is a diagram for explaining a temporal relationship between the travel distances YM of droplets and the set contents for delay times and the like in each of the timing determining circuit 70 and the delay processing circuit 8a of the first embodiment.

FIG. 19B illustrates a table for explaining specific examples of set values for delay times TD.

The relational formula below may be established with respect to the minimum value of the delay time TD.

$$TD > TW/2 \quad \text{(Formula 8)}$$

Here, TW is the signal width of the passage timing signals which are input from the droplet detector 41.

With respect to the maximum value of the delay time TD, the relational formula below may be established, as illustrated in FIG. 19A.

$$TD + TS < TM - TU = TM - (TP + TG + TL + TB) \quad \text{(Formula 9)}$$

Here, TS is a delay time until a trigger signal is generated, which is set arbitrarily as illustrated in FIG. 17.

TM is an amount of time required for the droplet 271 to reach the plasma generating region 25 from the detection point P, at which the droplet 271 is detected by the droplet detector 41.

The relational formula below may be established for TM.

$$TM = YM/VM \quad \text{(Formula 10)}$$

Here, YM is the travel distance of the droplet 271.

VM is the travel velocity of the droplet 271.

In addition, TU is a delay time that may be uniquely generated, and may include TP, TG, TL, and TB below.

TP is an electrical signal transfer delay time.

TG is a signal processing delay time.

TL is a laser beam generation delay time.

TB is a laser beam propagation delay time.

The delay time TD may be set to a value close to the minimum value compared to the delay time TS.

Specific examples of each of the delay times are shown in FIG. 19B. TP, TG, TL, and TB may be constant values unique to the passage timing signal system 42. For this reason, the maximum value and the minimum value of TD are defined by the degree to which TS is secured. The maximum value for TD which is capable of being set changes with respect to changes in the system, such as changes in the travel velocity of the droplets 271. The same applies to cases in which the distance from the detection point P to the plasma generating region 25 changes as well. As described above, TD may depend on the predetermined reference value for the total integrated value (C). There are cases in which time and labor will be required to change predetermined reference value for the total integrated value (C), depending on the timing determining circuit 70. Therefore, TD may be set to be constant, and changes in the system may be dealt with by TS. For example, TS may be set at the maximum value in advance, in order to secure a large range of changes for TS. In this case, TD may be set to the minimum value. Alternatively, TD may be set to a value close to the minimum value, taking jitter into consideration. In the case of FIG. 19B, TD may be set to $2.0 \cdot 10^{-6}$ [sec], for example.

[6.5 Effect]

According to the EUV light generating apparatus 1 of the first embodiment, the timing at which trigger signals are output to the laser apparatus 3 will be set appropriately with respect to the timings of the passage time midpoints of the droplets 271, regardless of the size of the droplets 271.

For this reason, the pulsed laser beam 33 will be accurately focused on the droplets 271 and the droplets 271 will be accurately irradiated with the pulsed laser beam 33 in the plasma generating region 25.

Accordingly, the light emitting efficiency of the EUV light 251 which is generated by the droplets 271 being irradiated with the pulsed laser beam 33 will improve. Because the position and timings at which the droplets 271 are irradiated with the pulsed laser beam 33 will become accurate, it will also become possible to reduce the amount of debris and the like.

In addition, the passage time midpoint calculating process, the delay time TD calculating process, and the droplet detection signal generating process performed by the timing determining circuit 70 may be performed by simple circuit elements such as a counter or an integrator/adder. Therefore, increases in the number of components and logical mathematic operations can be suppressed.

For this reason, it will become possible to realize the timing determining circuit 70 without causing deterioration in reliability due to complexification of the circuit.

[7. EUV Light Generating Apparatus Equipped with Timing Determining Circuit According to Second Embodiment]

[7.1 Configuration]

The configuration of a timing determining circuit 71 provided in an EUV light generating apparatus 1 according to a second embodiment will be described with reference to FIG. 20.

Here, FIG. 20 is a diagram for explaining the configuration of the timing determining circuit 71 provided in the EUV light generating apparatus 1 of the second embodiment.

The timing determining circuit 71 of the second embodiment may employ a circuit constituted by general purpose logic integrated circuits or individual semiconductor components as the timing determining circuit 70 within the control unit 8A of the first embodiment illustrated in FIG. 16A.

The other configurations of the timing determining circuit 71 of the second embodiment may be the same as the configurations of the timing determining circuit 70 of the first embodiment illustrated in FIG. 16A.

Descriptions of the configurations of the timing determining circuit 71 of the second embodiment which are the same as the configurations of the timing determining circuit 70 of the first embodiment illustrated in FIG. 16A will be omitted.

The timing determining circuit 71 of the second embodiment may include a timing generating unit 71a, a counter unit 71b, and a comparing unit 71c as illustrated in FIG. 20, in order to perform the MPD process in a similar manner as in the first embodiment.

The timing determining circuit 71 may be equipped with an integrated circuit such as an FPGA (Field Programmable Gate Array) on which the timing generating unit 71a, the counter unit 71b, and the comparing unit 71c are mounted as logic elements.

Alternatively, the timing determining circuit 71 may be equipped with an integrated circuit such as an ASIC (Application Specific Integrated Circuit) on which the timing generating unit 71a, the counter unit 71b, and the comparing unit 71c are mounted as logic elements.

[7.2 Operation]

FIG. 21 illustrates a time chart related to the generation of droplet detection signals based on the MPD process performed by the timing determining circuit 71 of the second embodiment.

Among the items of control which are exerted by the timing determining circuit 71 illustrated in FIG. 21, descriptions of items of control and operations which are the same as those of the timing determining circuit 70 illustrated in FIG. 17 and FIG. 18 will be omitted.

Among the items of control which are exerted by the timing determining circuit 71 illustrated in FIG. 21, descriptions of items of control and operations which are the same as those of the MPD process illustrated in FIG. 17 and FIG. 18 will be omitted.

Passage timing signals may be input to the timing generating unit 71a from the droplet detector 41, as input pulse signals (IN).

The timing generating unit 71a may specify timings at which changes in the passage timing signals, which are the input pulse signals (IN), start, based on the input pulse signals (IN). The timing generating unit 71a may generate passage start signals (IN1) based on the specified timings at which changes in the passage timing signals start. The timing generating unit 71a may output the generated passage start signals (IN1) to the counter unit 71b.

The timing generating unit 71a may specify timings at which changes in the passage timing signals, which are the input pulse signals (IN), end, based on the input pulse signals (IN). The timing generating unit 71a may generate passage end signals (IN2) based on the specified timings at which changes in the passage timing signals end. The timing generating unit 71a may output the generated passage start signals (IN2) to the counter unit 71b.

The counter unit 71b may perform a first integrating process that integrates a constant value at a constant speed from a timing (IN1=ON) at which a passage start signal (IN1) is input, based on the input passage start signal (IN1).

That is, the first integrating process may be a process that integrates a predetermined value per unit time.

The predetermined value, which is a constant value, may be stored in the memory within the control unit 8A. Alternatively, the predetermined value, which is a constant value, may be input to the control unit 8A via a network or the like. The predetermined value, which is a constant value, may also be manually input to the control unit 8A by an operator or the like.

The counter unit 71b may perform a second integrating process that integrates a value twice the value obtained by the first integrating process at the same constant speed as that of the first integrating process, from a timing (IN2=ON) at which a passage end signal (IN2) is input, based on the input passage end signal (IN2).

That is, the second integrating process may be a process that integrates a value, which is twice the predetermined value of the first integrating process, per unit time.

The counter unit 71b may calculate a total integrated value (CV) by totaling the first integrated value calculated by the first integrating process and the second integrated value calculated by the second integrating process. The counter unit 71b may output the calculated total integrated value (CV) to the comparing unit 71c as a digital signal.

A predetermined reference value (CC) which is set in advance, may be input to the comparing unit 71c. The comparing unit 71c may compare the input total integrated value (CV) and the reference value (CC) to determine whether the input total integrated value (CV) exceeds the reference value (CC).

Here, the predetermined reference value (CC) may be stored in the memory within the control unit 8A. Alternatively, the predetermined reference value (CC) may be input to the control unit 8A via a network or the like. The predetermined reference value (CC) may also be manually input to the control unit 8A by an operator or the like.

In the case that the comparing unit 71c determines that the total integrated value (CV) has exceeded the reference value (CC), the comparing unit 71c may specify the point in time at which the total integrated value (CV) has exceeded the reference value (CC).

The timing determining circuit 71 may output droplet detection signals to the delay processing circuit 8a by the same controls and operations as those of the MPD process illustrated in FIG. 17 and FIG. 18.

In addition, the comparing unit 71c may generate the droplet detection signals (OUT) based on the timings at which the total integrated value (CV) has exceeded the reference value (CC). Thereafter, the comparing unit 71b may output the droplet detection signals to the delay processing circuit 8a.

Note that the comparing unit 71c may output signals (OUT) that indicate that the total integrated value (CV) has exceeded the reference value (CC) or that the total integrated value (CV) has not exceeded the reference value (CC).

The timing determining circuit 71 may further include a clock circuit configured to present a time reference for the integrating processes, a reset circuit configured to reset the integrated value to zero, and a control circuit configured to control these circuits, in addition to the logic components illustrated in FIG. 20.

[8. EUV Light Generating Apparatus Equipped with Timing Determining Circuit According to Third Embodiment]

[8.1 Configuration]

The configuration of a timing determining circuit 72 provided in an EUV light generating apparatus 1 according to a third embodiment will be described with reference to FIG. 22.

Figure 22:
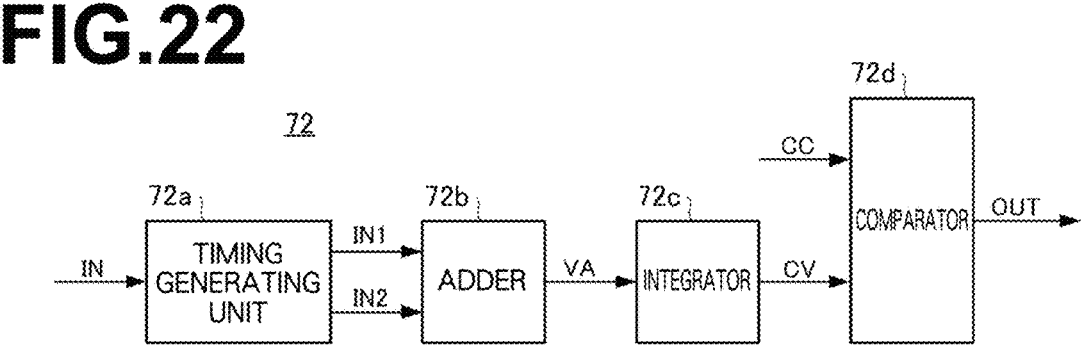
FIG. 22 is a diagram for explaining the configuration of a timing determining circuit provided in an EUV light generating apparatus according to a third embodiment.

Here, FIG. 22 is a diagram for explaining the configuration of the timing determining circuit 72 provided in the EUV light generating apparatus 1 of the third embodiment.

The timing determining circuit 72 of the third embodiment may employ a circuit constituted by analog components such as an operational amplifier as the timing determining circuit 70 within the control unit 8A of the first embodiment illustrated in FIG. 16A.

The other configurations of the timing determining circuit 72 of the third embodiment may be the same as the configurations of the timing determining circuit 70 of the first embodiment illustrated in FIG. 16A.

Descriptions of the configurations of the timing determining circuit 72 of the third embodiment which are the same as the configurations of the timing determining circuit 70 of the first embodiment illustrated in FIG. 16A will be omitted.

The timing determining circuit 72 of the third embodiment may include a timing generating unit 72a, an adder 72b, an integrator 72c, and a comparator 72d as illustrated in FIG. 22, in order to perform the MPD process in a similar manner as in the first embodiment.

[8.2 Operation]

Figure 23:
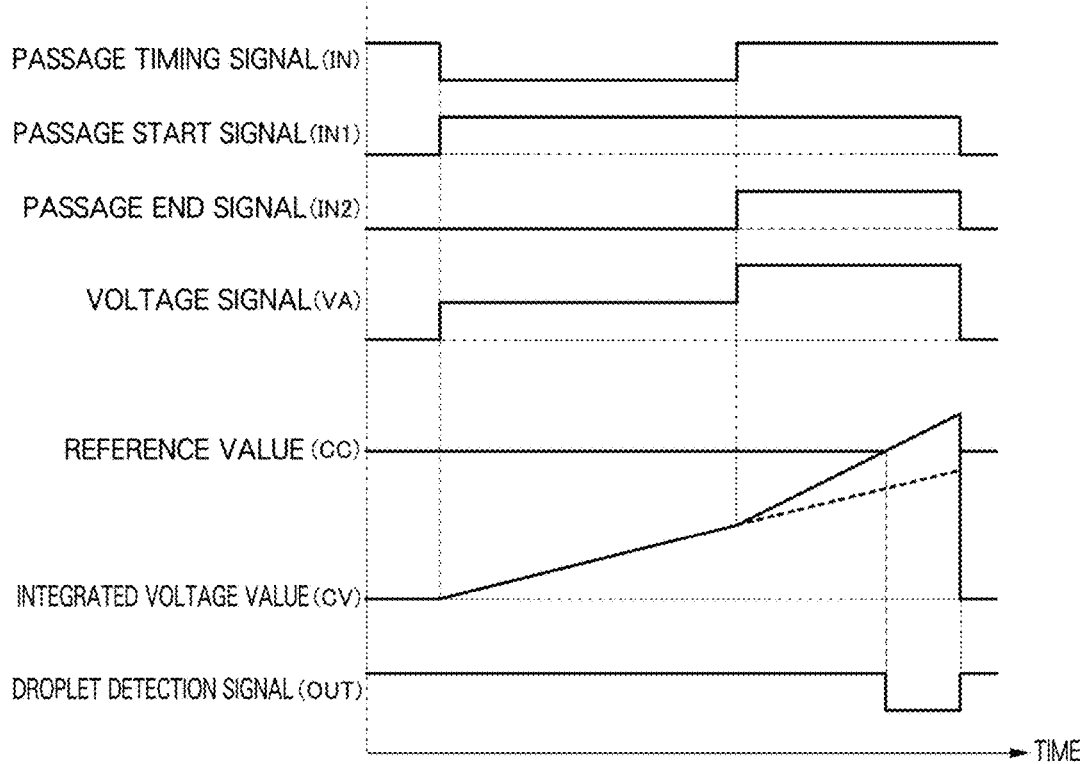
FIG. 23 illustrates a time chart related to generation of droplet detection signals in the timing determining circuit of the third embodiment.

FIG. 23 illustrates a time chart related to the generation of droplet detection signals based on the MPD process performed by the timing determining circuit 72 of the third embodiment.

Among the items of control which are exerted by the timing determining circuit 72 illustrated in FIG. 23, descriptions of items of control and operations which are the same as those of the timing determining circuit 70 illustrated in FIG. 17 and FIG. 18 will be omitted.

Among the items of control which are exerted by the timing determining circuit 72 illustrated in FIG. 23, descriptions of items of control and operations which are the same as those of the MPD process illustrated in FIG. 17 and FIG. 18 will be omitted.

Passage timing signals may be input to the timing generating unit 72a from the droplet detector 41, as input pulse signals (IN).

The timing generating unit 72a may specify timings at which changes in the passage timing signals, which are the input pulse signals (IN), start, based on the input pulse signals (IN). The timing generating unit 72a may generate passage start signals (IN1) based on the specified timings at which changes in the passage timing signals start. The timing generating unit 72a may output the generated passage start signals (IN1) to the adder 72b.

The timing generating unit 72a may specify timings at which changes in the passage timing signals, which are the input pulse signals (IN), end, based on the input pulse signals (IN). The timing generating unit 72a may generate passage end signals (IN2) based on the specified timings at which changes in the passage timing signals end. The timing generating unit 72a may output the generated passage start signals (IN2) to the adder 72b.

The adder 72b may output a constant voltage signal (VA) to the integrator 72c from a timing (IN1=ON) at which a passage start signal (IN1) is input, based on the input passage start signal (IN1).

The voltage signal, which is a predetermined constant value, may be stored in the memory within the control unit 8A. Alternatively, voltage signal, which is a predetermined constant value, may be input to the control unit 8A via a network or the like. The voltage signal, which is a predetermined constant value, may also be manually input to the control unit 8A by an operator or the like.

The adder 72b may output a voltage signal (VA) which is twice the voltage signal which has been output based on input of the passage start signal (IN1) from a timing (IN2=ON) at which input of a passage end signal (IN2) begins, based on the input passage end signal (IN2).

The integrator 72c may integrate the input voltage signal (VA) as time elapses, as illustrated in FIG. 23.

The integrator 72c may perform a first integrating process that integrates the voltage signal (VA), which is a constant predetermined value, from the timing (IN1=ON) at which input of the passage start signal (IN1) begins.

That is, the first integrating process may be a process that integrates the voltage signal (VA), which is a predetermined value, per unit time.

The integrator 72c may perform a second integrating process that integrates the voltage signal (VA), which is twice the value of the predetermined value, from the timing (IN2=ON) at which input of the passage end signal (IN2) begins.

That is, the second integrating process may be a process that integrates the voltage signal (VA), which is twice the predetermined value of the first integrating process, per unit time.

The integrator 72c may output an integrated voltage value (CV), which is a total of the voltage values (VA) integrated by the first integrating process and the second integrating process, to the comparator 72d as a voltage signal.

A signal that represents a predetermined reference value (CC) which is determined in advance may be input to the comparator 72d. The comparator 72d may determine whether the input integrated voltage value (CV) has exceeded the reference value (CC).

The predetermined reference value (CC) may be stored in the memory within the control unit 8A. Alternatively, the predetermined reference value (CC) may be input to the control unit 8A via a network or the like. The predetermined reference value (CC) may also be manually input to the control unit 8A by an operator or the like.

In the case that the comparator 72d determines that the integrated voltage value (CV) has exceeded the reference value (CC), the comparator 72d may specify the point in time at which the integrated voltage value (CV) has exceeded the reference value (CC).

The timing determining circuit 72 may output droplet detection signals to the delay processing circuit 8a by the same controls and operations as those of the MPD process illustrated in FIG. 17 and FIG. 18.

In addition, the comparator 72d may generate the droplet detection signals (OUT) based on the timings at which the integrated voltage value (CV) has exceeded the reference value (CC). Thereafter, the comparator 72d may output the droplet detection signals to the delay processing circuit 8a.

Note that the comparator 72d may output signals (OUT) that indicate that the integrated voltage value (CV) has exceeded the reference value (CC) or that the integrated voltage value (CV) has not exceeded the reference value (CC).

The timing determining circuit 72 may further include a digital/analog converting circuit configured to present the reference value (CC), a reset circuit configured to reset the integrated voltage value (CV) to zero, and a control circuit configured to control these circuits, in addition to the circuit elements illustrated in FIG. 22.

[9. EUV Light Generating Apparatus Equipped with Droplet Detector and Light Sensor According to Fourth Embodiment]

[9.1 Configuration]

The configurations of a light sensor 412ba of a droplet detector 41 provided in an EUV light generating apparatus 1 of a fourth embodiment will be described with reference to FIG. 24.

Figure 24:
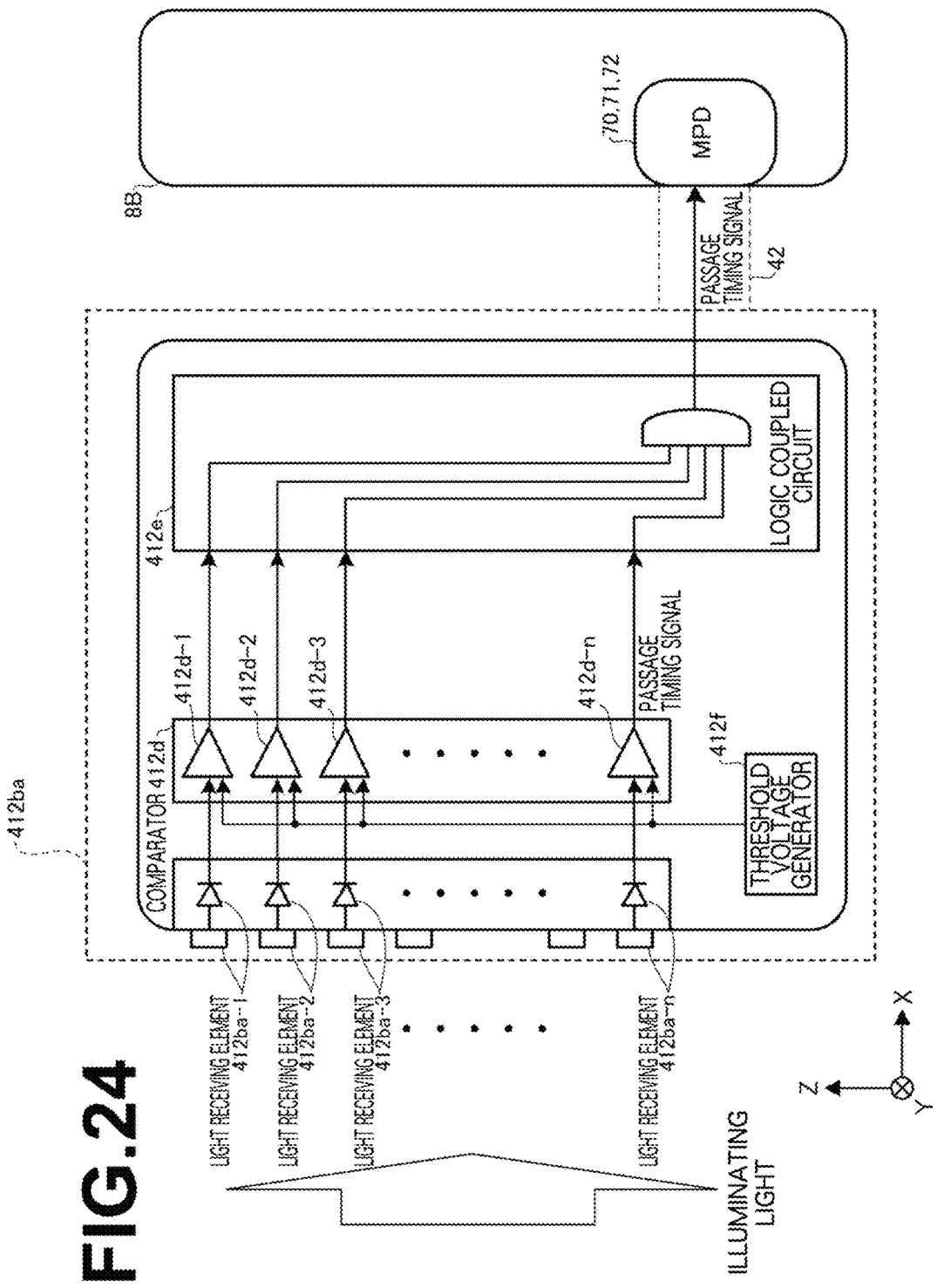
FIG. 24 is a diagram for explaining the configuration of a light sensor of a droplet detector provided in an EUV light generating apparatus according to a fourth embodiment.

Here, FIG. 24 is a diagram for explaining the configuration of the light sensor 412ba of the droplet detector 41 provided in the EUV light generating apparatus 1.

In the light sensor 412ba of the fourth embodiment, a PDA (Photo Diode Array), which is a multiple element sensor, may be applied as the light sensor 412b illustrated in FIG. 2, FIG. 4, FIG. 15, and FIG. 16A.

The other configurations of the light sensor 412ba may be the same as those of the light sensor 412b illustrated in FIG. 2, FIG. 4, FIG. 15, and FIG. 16A.

Descriptions of the configurations of the light sensor 412ba which are the same as those of the light sensor 412b illustrated in FIG. 2, FIG. 4, FIG. 15, and FIG. 16A will be omitted.

As illustrated in FIG. 24, the light sensor 412*ba* may be equipped with a great number of light receiving elements 412*ba*-1, etc., a comparator 412*d* that includes a great number of comparators 412*d*-1, etc., a logic coupled circuit 412*e*, and a threshold voltage generator 412*f*.

The timing determining circuit 70, 71, or 72 may be provided within a control unit 8B, as illustrated in FIG. 24.

The great number of light receiving elements 412*ba*-1, etc. may output light sensor output signals to the comparator 412*d* by being irradiated with the illuminating light.

Signals related to the threshold voltage may be input to the great number of comparators 412*d*-1, etc. from the threshold voltage generator 412*f*. The light sensor output signals may be input to the great number of comparators 412*d*-1, etc. from the great number of light receiving elements 412*ba*-1, etc. Each of the great number of comparators 412*d*-1, etc. may output an individual passage timing signal to the logic coupled circuit 412*e*, based on the signal related to the threshold voltage and the light sensor output signal input thereto.

The logic coupled circuit 412*e* may output passage timing signals to the timing determining circuit 70, 71, or 72 within the control unit 8B, based on the great number of individual passage timing signals input thereto.

In the fourth embodiment, the timing determining circuit 70, 71, or 72 is not limited to being provided within the control unit 8B, but may alternatively be provided within the light sensor 412*ba* or within the passage timing signal system 42, as long as the passage timing signals which are output from the logic coupled circuit 412*e* are input thereto.

The timing determining circuit 70, 71, or 72 in the fourth embodiment may perform the MPD process based on input of the passage timing signals in a similar manner as in the first embodiment.

[9.2 Effect]

Figure 25:
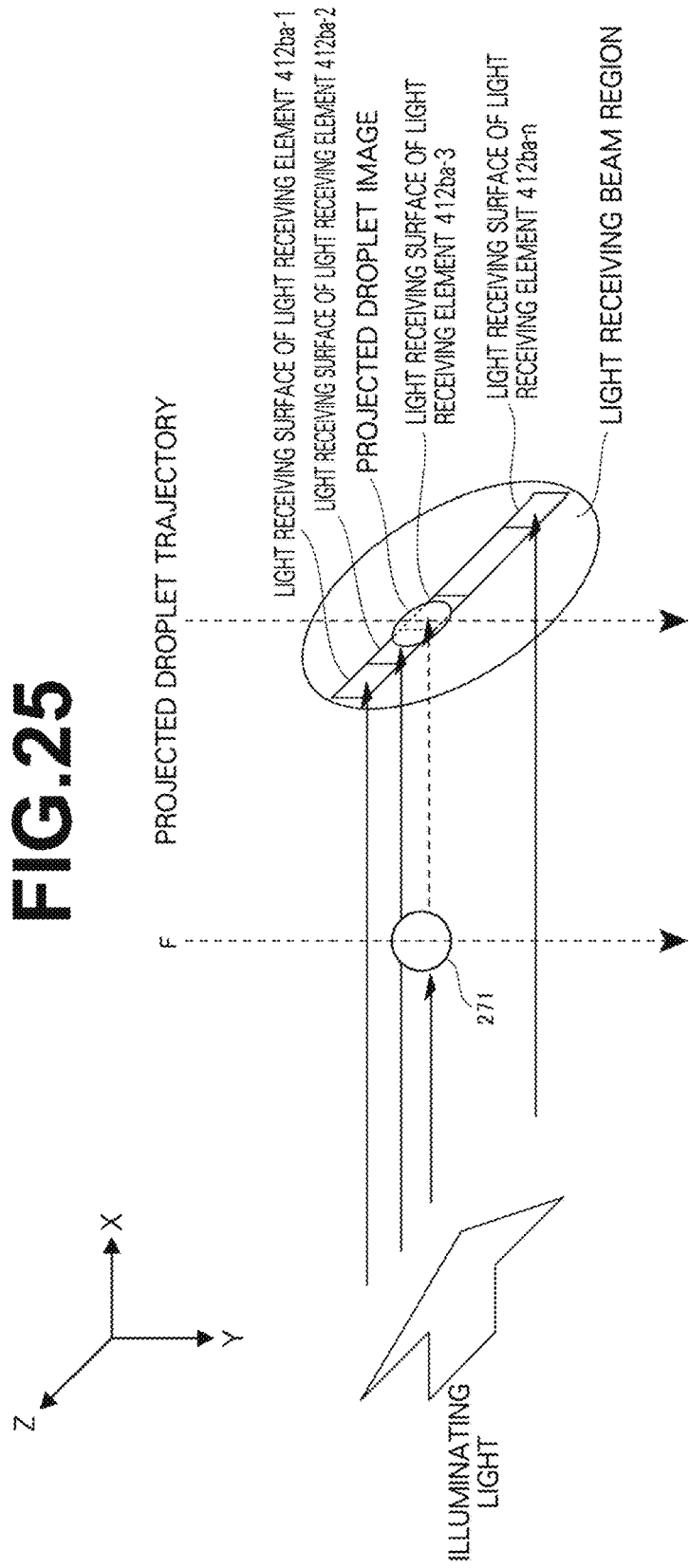
FIG. 25 illustrates an example of a projected image of a droplet at a light receiving surface of a light sensor of the droplet detector illustrated in FIG. 24.

Here, FIG. 25 illustrates an example of a projected image of a droplet 271 at a light receiving surface of the light sensor 412*ba* illustrated in FIG. 24.

Figure 26:
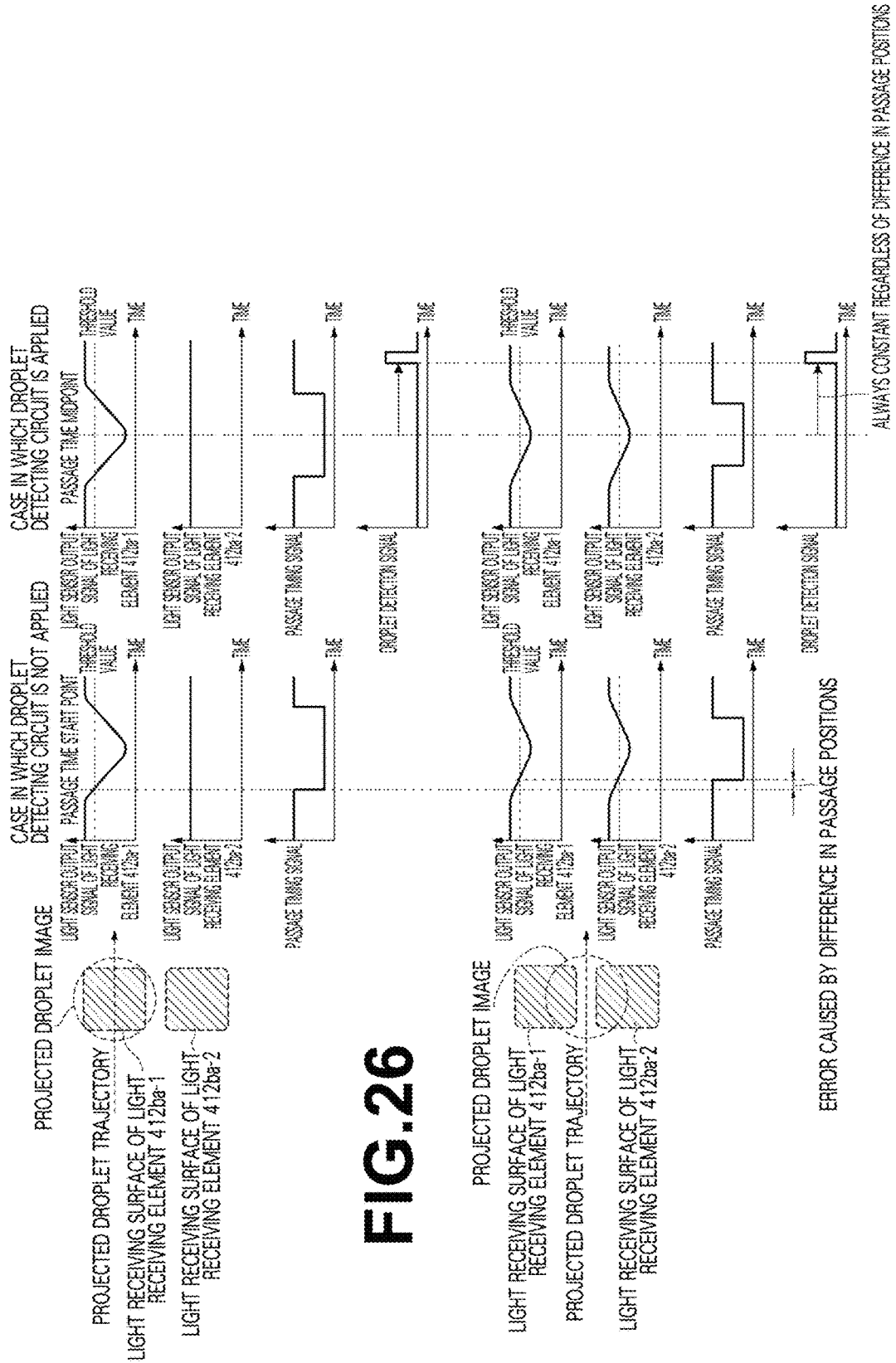
FIG. 26 illustrates a time chart related to output of droplet detection signals by a control unit of the EUV light generating apparatus of the fourth embodiment.

FIG. 26 illustrates a time chart related to output of droplet detection signals by the control unit 8A of the EUV light generating apparatus 1 of the fourth embodiment, based on detection of droplets.

In the light sensor 412*ba*, which is a PDA having multiple sensor elements, the projected droplet trajectory on the light receiving surface of the light sensor 412*ba* may pass through the vicinities of centers of the light receiving surfaces of each of the light receiving elements 412*ba*-1, etc.

Further, as illustrated in FIG. 25, the projected droplet trajectory may pass through the vicinities of boundaries among adjacent light receiving elements 412*ba*-1, etc.

Here, the upper portion of FIG. 26 illustrates a time chart related to generating droplet detection signals based on detection of the droplets 271 in the case that the projected droplet trajectory passes through the vicinities of the light receiving surfaces of each of the light receiving elements 412*ba*-1, etc.

The lower portion of FIG. 26 illustrates a time chart related to generating droplet detection signals based on detection of the droplets 271 in the case that the projected droplet trajectory passes through the vicinities of boundaries among adjacent light receiving elements 412*ba*-1, etc.

In addition, the column toward the left side of FIG. 26 may illustrate the positions of the projected droplet trajectories with respect to the light receiving elements 412*ba*-1, etc.

The column at the middle of FIG. 26 may illustrate time charts for a case in which an MPD process by the timing determining circuit 70, 71, or 72 is not applied to the light sensor 412*ba*.

The column toward the right side of FIG. 26 may illustrate time charts for a case in which an MPD process by the timing determining circuit 70, 71, or 72 is applied to the light sensor 412*ba*.

Here, in the case that the position of the projected droplet trajectory with respect to a plurality of light receiving elements changes from the state illustrated at the upper portion of the left column of FIG. 26 to the state illustrated at the lower portion of the left column of FIG. 26, the timings of the passage timing signals which are output from each of the light receiving elements 412*ba*-1, etc. may change from the state illustrated at the upper portion of the middle column of FIG. 26 to the state illustrated at the lower portion of the middle column of FIG. 26, as illustrated in the middle column.

For this reason, in the case that trigger signals are output to the laser apparatus 3 after a constant delay time TL has elapsed, based on the timings at which the passage timing signals are generated, the output timings of the trigger signals may change with respect to the passage time midpoint of each of the droplets 271.

Accordingly, the timing at which the droplet 271 reaches the plasma generating region 25 and the timing at which the pulsed laser beam 33 is output may not match in the plasma generating region 25.

However, in the case that the timing determining circuit 70, 71, or 72 is applied to the light sensor 412*ba*, the timings at which the droplet detection signals are generated will always be constant with respect to the passage time midpoints of the droplets 271 without depending on changes in the projected droplet trajectory position, as illustrated in the right column of FIG. 26.

[10. EUV Light Generating Apparatus Equipped with Droplet Detector and Control Unit According to Fifth Embodiment]

[10.1 Configuration]

The configurations of a droplet sensor 41A and a control unit 8C provided in an EUV light generating apparatus 1 according to a fifth embodiment will be described with reference to FIG. 27.

Figure 27:
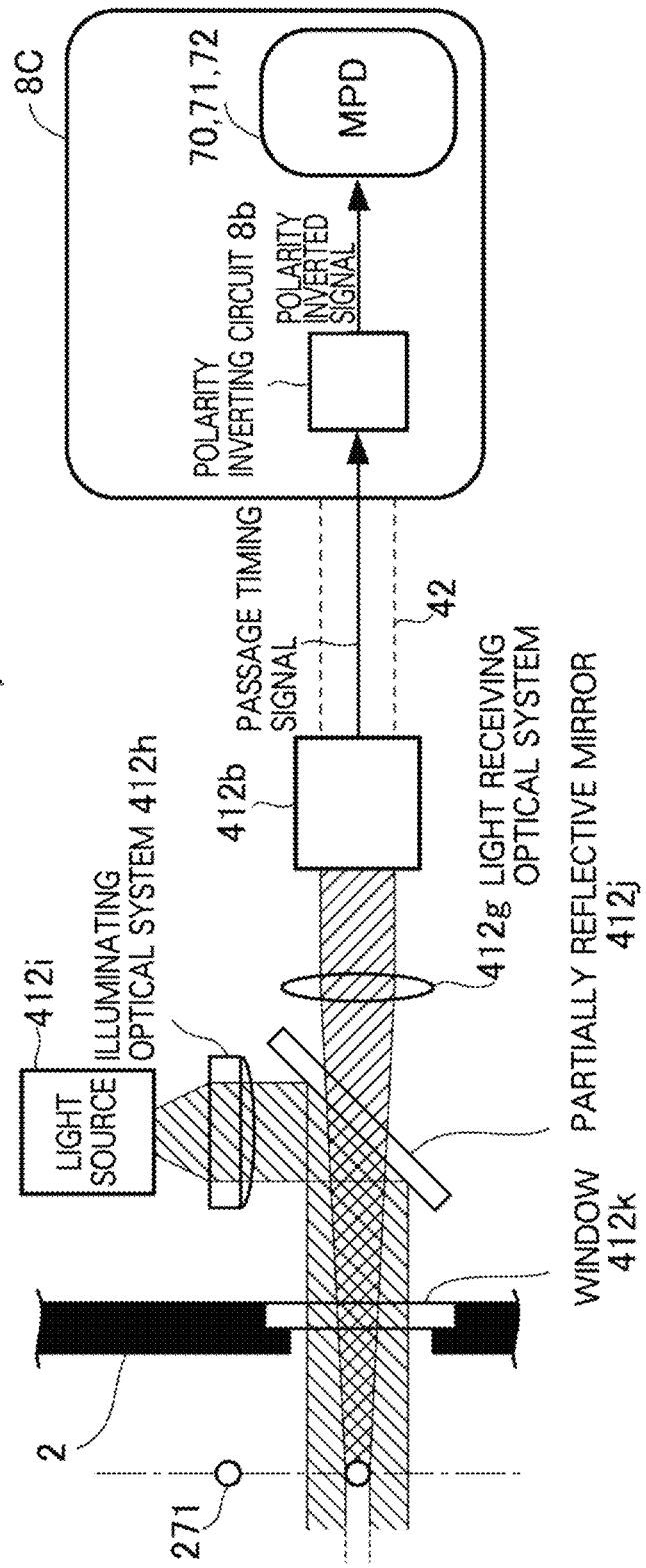
FIG. 27 is a diagram for explaining the configurations of a droplet detector and a control unit provided in an EUV light generating apparatus according to a fifth embodiment.

Here, FIG. 27 is a diagram for explaining the configurations of the droplet detector 41A and the control unit 8C provided in the EUV light generating apparatus 1 according to the fifth embodiment.

The droplet detector 41A of the fifth embodiment may differ from the droplet detectors 41 illustrated in FIG. 2 and FIG. 15 in that the light source unit 411 and the light receiving unit 412 of the droplet detector 41 are of an integrated configuration.

The droplet detector 41A of the fifth embodiment illustrated in FIG. 27 may differ from the droplet detector 41 which detects transmitted light illustrated in FIG. 2 and FIG. 15 in that the droplet detector 41A detects reflected light from the droplets 271.

The droplet detector 41A of the fifth embodiment may differ from the droplet detectors 41 illustrated in FIG. 2 and FIG. 15 in that it is provided with a partially reflective mirror 412*j*.

In the droplet detector 41A of the fifth embodiment, a light source 412*i* and an illuminating optical system 412*h* may be provided within the light receiving unit 412 illustrated in FIG. 2 and FIG. 15.

The other configurations of the droplet detector 41A of the fifth embodiment may be the same as those of the droplet detectors 41 illustrated in FIG. 2 and FIG. 15.

Descriptions of the configurations of the droplet detector 41A of the fifth embodiment which are the same as those of the droplet detectors 41 illustrated in FIG. 2 and FIG. 15 will be omitted.

The droplet detector 41A may be provided with the partially reflective mirror 412*j*, as illustrated in FIG. 27.

In the droplet detector 41A, the light sensor 412*b*, a light receiving optical system 412*g*, the partially reflective mirror 412*j*, the light source 412*i*, and the illuminating optical system 412*h* may be provided in the same housing, which is not illustrated.

The partially reflective mirror 412*j* may reflect the illuminating light which is output from the light source 412*i* toward the droplets 271 via the illuminating light optical system 412*h*.

The partially reflective mirror 412*j* may transmit reflected light, which is reflected by the droplets 271 which are irradiated with the illuminating light, toward the light receiving optical system 412*g*.

A window 412*k* may reflect the illuminating light which is output from the light source 412*i*, and transmit the reflected light which is reflected by the droplets 271.

The light sensor 412*b* may generate passage timing signals based on light reception of reflected light from the droplets 271. The light sensor 412*b* may output the generated passage timing signals to the control unit 8C.

Here, the control unit 8C of the fifth embodiment may differ from the control unit 8 illustrated in FIG. 4, the control unit 8A illustrated in FIG. 16A, and the control unit 8B illustrated in FIG. 24 in that it is provided with a polarity inverting circuit 8*b*.

The other configurations of the control unit 8C of the fifth embodiment may be the same as those of the control units 8, 8A, and 8B which are illustrated in FIG. 4, FIG. 16A, and FIG. 24, respectively.

Descriptions of the configurations of the control unit 8C of the fifth embodiment which are the same as those of the control units 8, 8A, and 8B which are illustrated in FIG. 4, FIG. 16A, and FIG. 24 will be omitted.

As illustrated in FIG. 27, passage timing signals may be input to the polarity inverting circuit 8*b* from the light sensor 412*b*. The polarity inverting circuit 8*b* may invert the positive/negative signs of the input passage timing signals, to generate polarity inverted signals to be described later. The polarity inverting circuit 8*b* may output the generated polarity inverted signals to the timing determining circuit 70, 71, or 72.

The timing determining circuit 70, 71, or 72 of the fifth embodiment may perform the MOD process based on input of the polarity inverted signals in the same manner as that in the first embodiment.

In the fifth embodiment, the timing determining circuit 70, 71, or 72 is not limited to being provided within the control unit 8B, but may alternatively be provided within the light sensor 412*ba* or within the passage timing signal system 42, as long as the polarity inverted signals are input thereto.

[10.2 Operation]

The items of control which are exerted by the control unit 8C provided in the EUV light generating apparatus 1 of the fifth embodiment will be described with reference to FIG. 28.

Figure 28:
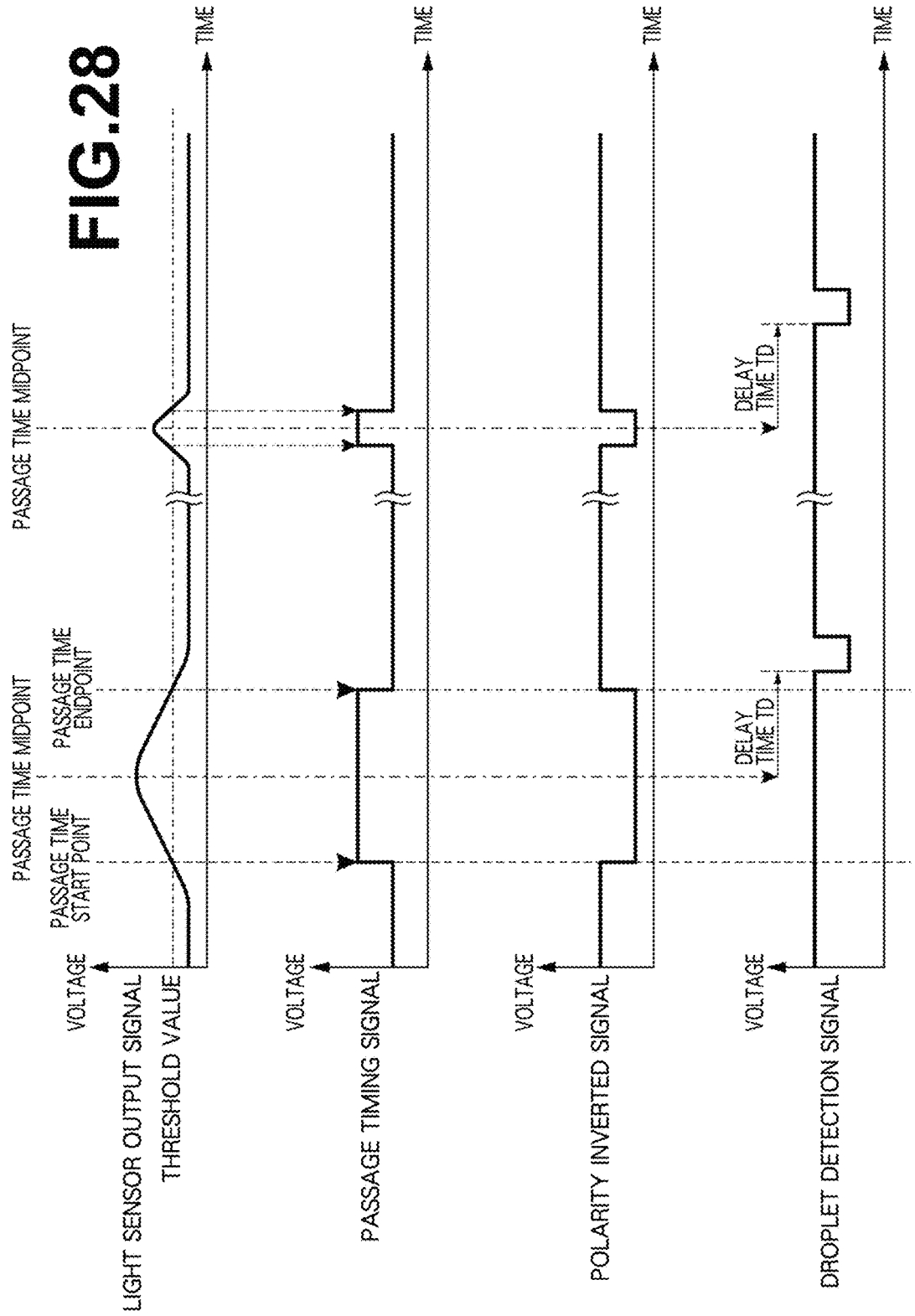
FIG. 28 illustrates a time chart related to output of droplet detection signals by the control unit of the EUV light generating apparatus of the fifth embodiment.

Among the items of control which are exerted by the control unit 8C illustrated in FIG. 28, descriptions of items of control and operations which are the same as those of the EUV light generating apparatuses 1 illustrated in FIG. 3, FIG. 5, FIG. 17, and FIG. 18 will be omitted.

FIG. 28 illustrates a time chart related to control exerted by the control unit 8C of the fifth embodiment, and is a time chart related to output of droplet detection signals based on detection of droplets 271.

Among the items of control which are exerted by the timing determining circuit 70, 71, or 72 illustrated in FIG. 28, descriptions of items of control and operations which are the same as those of the timing determining circuit 70 of the first embodiment illustrated in FIG. 18 will be omitted.

Among the items of control which are exerted by the timing determining circuit 70, 71, or 72 illustrated in FIG. 28, descriptions of items of control and operations which are the same as those of the MPD process illustrated in FIG. 17 and FIG. 18 will be omitted.

Here, in the fifth embodiment, a timing at which the light sensor output signal from the light sensor 412*b* becomes less than a threshold value will be referred to as a first timing in the same manner as in the first embodiment. A timing at which the light sensor output signal becomes greater than the threshold value will be referred to as a second timing.

For this reason, the first timing may be recognized to be a passage time endpoint in the fifth embodiment, as illustrated in FIG. 28.

The second timing may be a passage time start point, as illustrated in FIG. 28.

The light sensor 412*b* may generate passage timing signals, which are the passage timing signals illustrated in FIG. 3, FIG. 5, FIG. 17, and FIG. 18 with their positive/negative signs inverted, based on the signal waveform of the light sensor output signals as illustrated in FIG. 28. The light sensor 412*b* may output the generated passage timing signals to the polarity inverting circuit 8*b*.

The polarity inverting circuit 8*b* may generate polarity inverted signals, which are the input passage timing signals of which the positive/negative signs are inverted, as illustrated in FIG. 28. The polarity inverting circuit 8*b* may output the generated polarity inverted signals to the timing determining circuit 70, 71, or 72.

The timing determining circuit 70, 71, or 72 may calculate the passage time midpoint of the polarity inverted signals, based on the input polarity inverted signals.

The timing determining circuit 70, 71, or 72 may generate droplet detection signals after a delay time TD, which is a constant amount of time which is determined in advance, elapses from the calculated passage time midpoints, as illustrated in FIG. 28.

The timings at which the droplet detection signals are generated will always match the passage time midpoints of each of the droplets 271 regardless of variations in the timings at which input of the passage timing signals begins, as illustrated in FIG. 28.

[11. EUV Light Generating Apparatus Equipped with Passage Timing Signal System According to Sixth Embodiment]

[11.1 Configuration]

The configuration of a light sensor 412*bb* of a droplet detector 41 provided in an EUV light generating apparatus 1 according to a sixth embodiment will be described with reference to FIG. 29.

Figure 29:
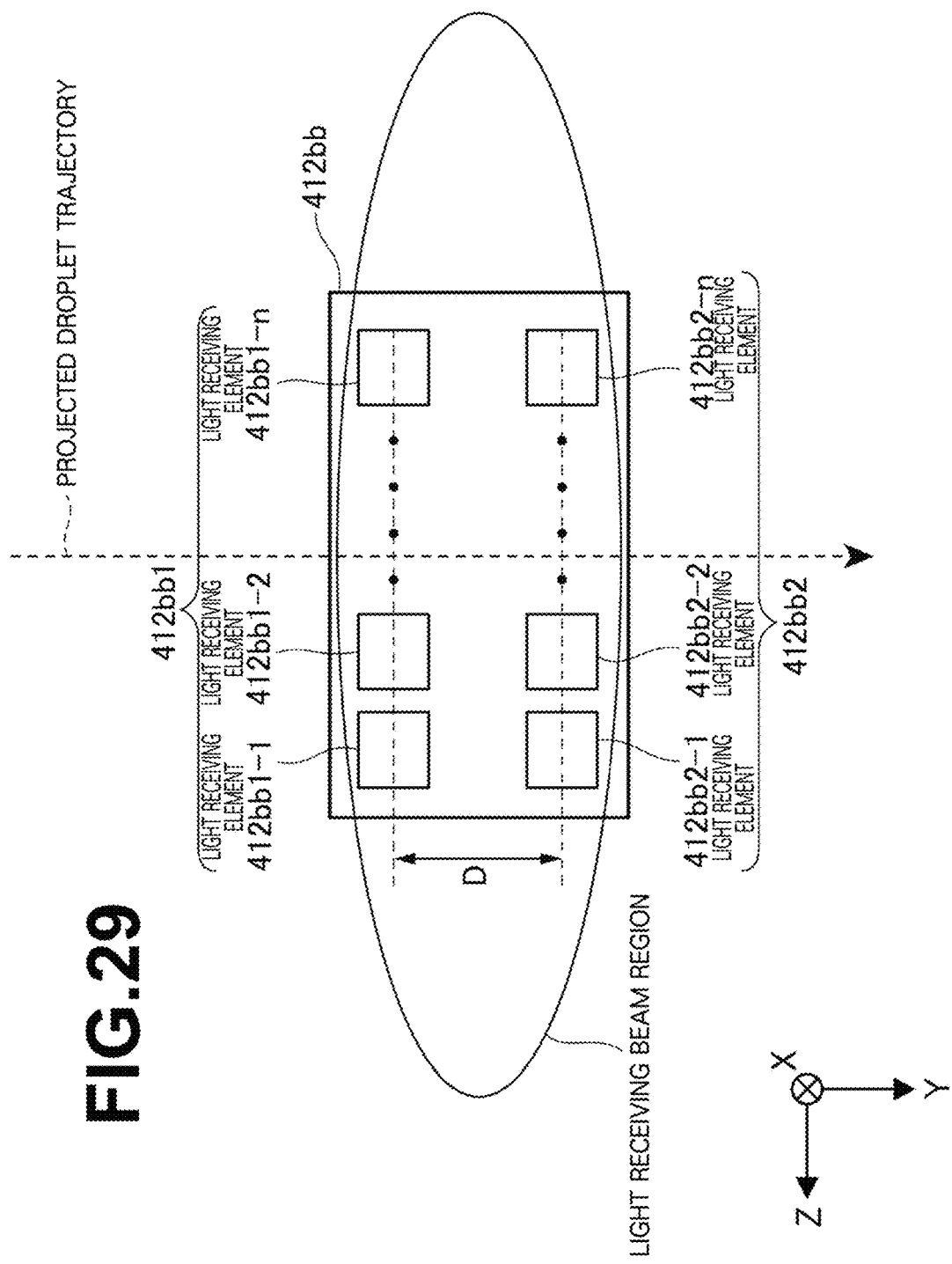
FIG. 29 is a diagram for explaining the configuration of a light sensor of a droplet detector provided in an EUV light generating apparatus according to a sixth embodiment.

Here, FIG. 29 is a diagram for explaining the configuration of the light sensor 412*bb* of the droplet detector 41 provided in the EUV light generating apparatus 1 according to the sixth embodiment.

The light sensor 412*bb* of the sixth embodiment may be applied to the droplet detector 41 as the light sensor 412*b* illustrated in FIG. 2, FIG. 4, FIG. 15, and FIG. 16A.

In the light sensor 412*bb*, a plurality of photodiode arrays 412*bb*1 and 412*bb*2, which are multiple element sensors as illustrated in FIG. 24, may be arrayed along the direction of the projected droplet trajectory, which substantially matches the direction that the droplets 271 travel in, as illustrated in FIG. 29. At least two photodiode arrays 412*bb*1 and 412*bb*2 may be provided within the light sensor 412*bb*. The photodiode arrays 412*bb*1 and 412*bb*2 may be provided along the direction of the projected droplet trajectory at predetermined intervals D. The photodiode arrays 412*bb*1 and 412*bb*2 may be provided substantially parallel to a direction that substantially perpendicularly intersects the projected droplet trajectory.

The photodiode array 412*bb*1 may be constituted by a great number of light receiving elements 412*bb*1-1, etc. The photodiode array 412*bb*2 may be constituted by a great number of light receiving elements 412*bb*2-1, etc.

In FIG. 29, the region of the light sensor 412*b* which is irradiated with the illuminating light from the light source unit 411 may be indicated as a light receiving beam region. Substantially all of the great number of light receiving elements 412*bb*1-1, 412*bb*2-1, etc. may be provided within the light receiving beam region.

The other configurations of the light sensor 412*bb* of the sixth embodiment may be the same as those of the light sensor 412*b* illustrated in FIG. 2, FIG. 4, FIG. 15, and FIG. 16A, as well as those of the light sensor 412*ba* illustrated in FIG. 24.

Descriptions of the configurations of the light sensor 412*bb* of the sixth embodiment which are the same as those of the light sensor 412*b* illustrated in FIG. 2, FIG. 4, FIG. 15, and FIG. 16A, as well as those of the light sensor 412*ba* illustrated in FIG. 24, will be omitted.

The configuration of a passage timing signal system 42 provided in the EUV light generating apparatus 1 of the sixth embodiment will be described with reference to FIG. 30.

Figure 30:
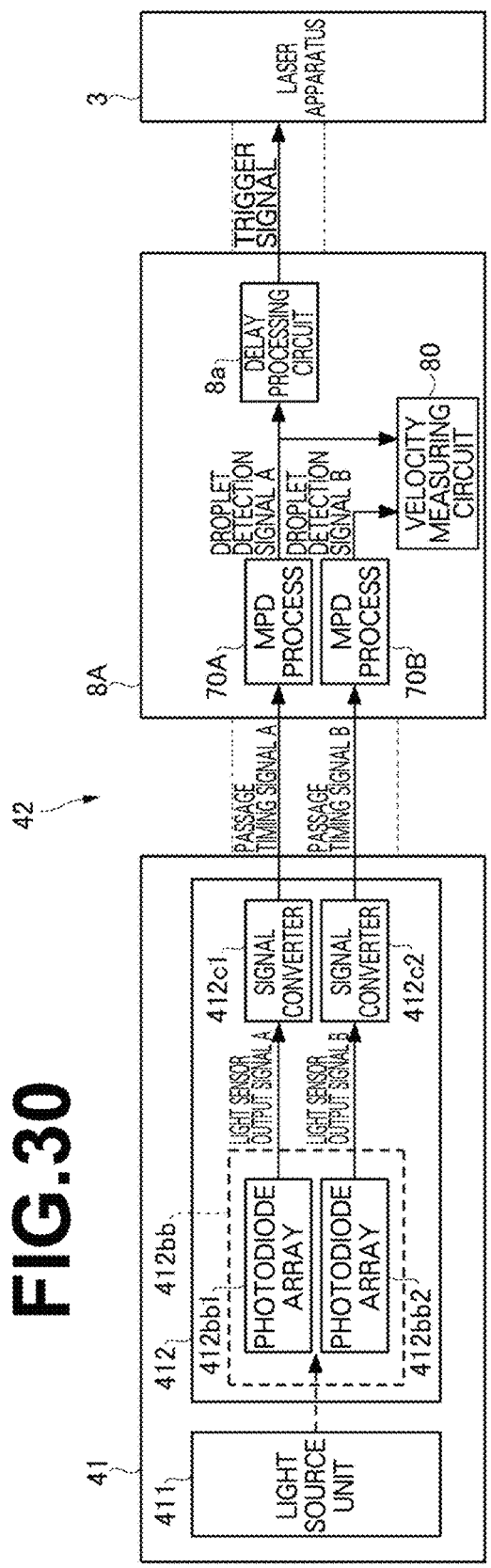
FIG. 30 is a diagram for explaining the configuration of a passage timing signal system provided in the EUV light generating apparatus of the sixth embodiment.

Here, FIG. 30 is a diagram for explaining the configuration of the passage timing signal system 42 provided in the EUV light generating apparatus 1 of the sixth embodiment.

The droplet detector 41 of the sixth embodiment differs from the droplet detector 41 illustrated in FIG. 16A, and may include signal converters 412*c*1 and 412*c*2.

The control unit 8A of the sixth embodiment differs from the control unit 8A illustrated in FIG. 16A, and may include timing determining circuits 70A and 70B, as well as a velocity measuring circuit 80.

The velocity measuring circuit 80 may perform a velocity measuring process that measures the travel velocity VM2 of the droplets 271, based on droplet detection signals A and B which are input from the timing determining circuits 70A and 70B.

In the case that the velocity measuring process is executed by a dedicated circuit, the velocity measuring circuit 80 may be provided within electronic circuitry of the light sensor 412*bb*, within the passage timing signal system 42, or within electronic circuitry of the control unit 8A.

In the case that the velocity measuring process is executed by logic functions, the velocity measuring circuit 80 may be provided within an integrated circuit utilized by electronic circuitry of the light sensor 412*b*, or within an integrated circuit utilized by electronic circuitry of the control unit 8A.

The other configurations of the passage timing signal system 42 of the sixth embodiment may be the same as those illustrated in FIG. 16A.

Descriptions of the configurations of the passage timing signal system 42 of the sixth embodiment which are the same as those illustrated in FIG. 16A will be omitted.

[11.2 Operation]

The signal converter 412*c*1 may output passage timing signals A, which are generated based on light sensor output signals A, to the control unit 8A. The signal converter 412*c*2 may output passage timing signals B, which are generated based on light sensor output signals B, to the control unit 8A.

The operations of the control unit 8A of the sixth embodiment will be described with reference to FIG. 31.

Figure 31:
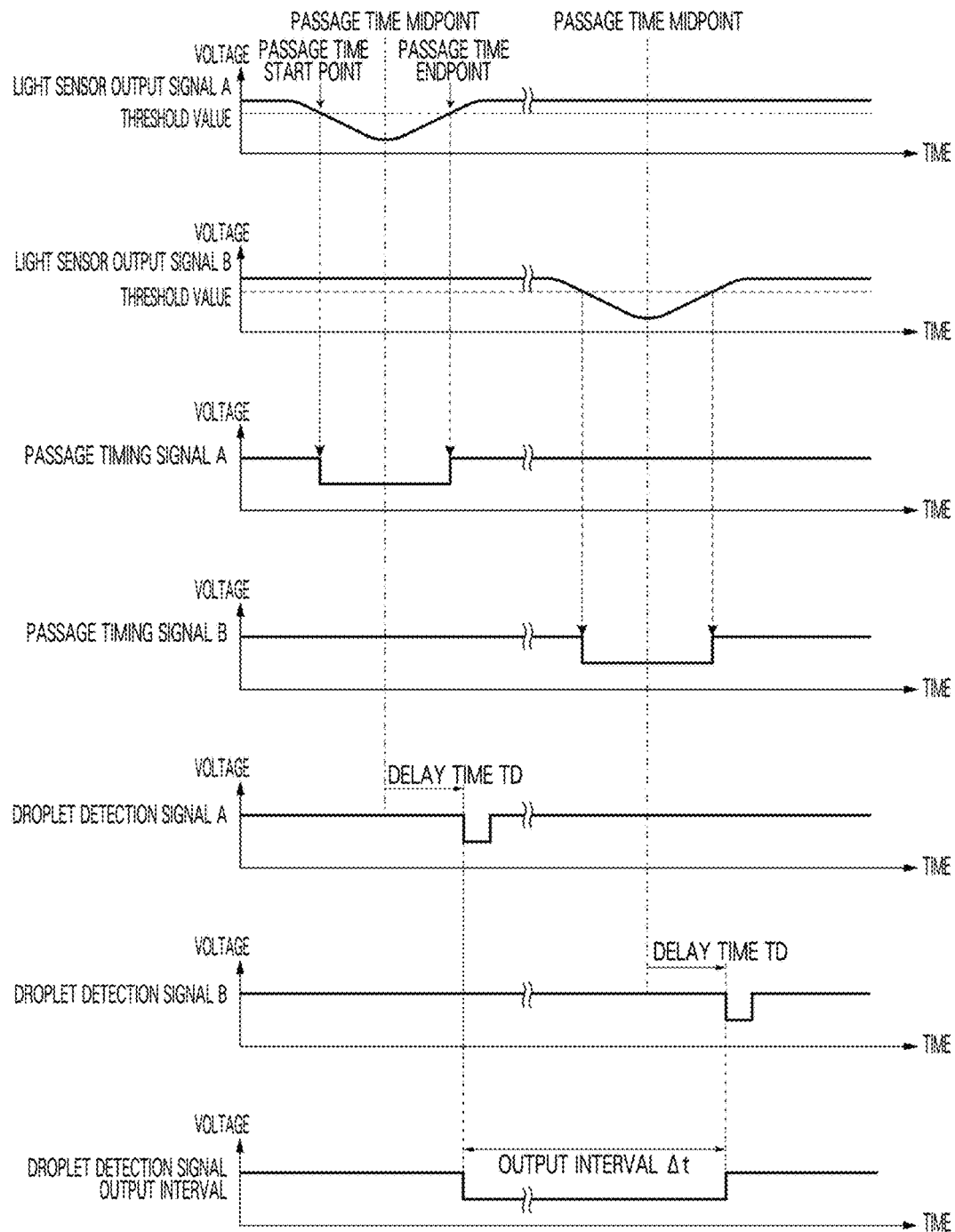
FIG. 31 illustrates a time chart related to droplet velocity measurement by a control unit of the EUV light generating apparatus of the sixth embodiment.

Among the items of control exerted by the control unit 8A illustrated in FIG. 31, descriptions of items of control and operations which are the same as those of the control unit 8A illustrated in FIG. 17 will be omitted.

Here, FIG. 31 illustrates a time chart related to droplet velocity measurement by the control unit 8A of the EUV light generating apparatus 1 of the sixth embodiment.

Passage timing signals A, which are output from the signal converter 412*c*1, may be input to the timing determining circuit 70A. The timing determining circuit 70A may perform the MPD process that includes the passage time midpoint calculating process, the delay time TD calculating process, and the droplet detection signal generating process in the same manner as the timing determining circuit 70 illustrated in FIG. 17 and FIG. 18. The timing determining circuit 70A may generate droplet detection signals A by the MPD process, based on the passage timing signals A.

The timing determining circuit 70A may output the droplet detection signals A to the delay processing circuit 8*a*. The timing determining circuit 70A may output the droplet detection signals A to the velocity measuring circuit 80.

Passage timing signals B, which are output from the signal converter 412*c*2, may be input to the timing determining circuit 70B. The timing determining circuit 70B may perform the MPD process in the same manner as the timing determining circuit 70A, and may generate droplet detection signals B by the MPD process, based on the passage timing signals B.

The timing determining circuit 70B may output the droplet detection signals B to the velocity measuring circuit 80. In addition, although not illustrated, the timing determining circuit 70B may output the droplet detection signals B to the delay processing circuit 8*a*.

The delay processing circuit 8*a* may generate trigger signals after a predetermined delay time TS elapses from the timing at which one of the droplet detection signals A and B is input, based on the input of the one of the droplet detection signals A and B.

The velocity measuring circuit 80 may measure an output interval Δt among the droplet detection signals A and B, based on the input of the droplet detection signals A and B. Here, the interval D among the photodiode arrays 412*bb*1 and 412*bb*2 which have output the light sensor output signals A and B are known. Therefore, the travel velocity VM2 of the droplets 271 may be measured by Formula 11 below.

$$VM2 = D/\Delta t \qquad \text{(Formula 11)}$$

The timing determining circuits 70A and 70B may store the measured travel velocity VM2 of the droplets 271 in the memory within the control unit 8A.

[11.3 Effect]

According to the EUV light generating apparatus 1 of the sixth embodiment, by being provided with the light sensor 412*bb* that includes the photodiode arrays 412*bb*1 and 412*bb*2, the light sensor output signals A and B can be output while appropriately tracking the travel velocity VM2 of the droplets 271. In addition, according to the EUV light generating apparatus 1 of the sixth embodiment, the droplet detection signals A and B can be generated at a plurality of positions by the photodiode arrays 412bb1 and 412bb2, which are arranged along the projected droplet trajectory at the interval D.

For this reason, according to the EUV light generating apparatus 1 of the sixth embodiment, the travel velocity VM2 of the droplets 271 can be accurately measured by the velocity measuring circuit 80 based on the droplet detection signals A and B.

Therefore, according to the EUV light generating apparatus 1 of the sixth embodiment, parameters related to generation of EUV light 252 can be controlled based on the measured travel velocity VM2. As a result, the energy stability of the EUV light 252 and the positional stability of the EUV light 252 within the plasma generating region 25 can be improved.

[12. EUV Light Generating Apparatus Equipped with Pressure Adjusting Mechanism and Timing Determining Circuit According to Seventh Embodiment]

[12.1 Configuration]

A pressure adjusting mechanism 30 provided in an EUV light generating apparatus 1 according to a seventh embodiment will be described with reference to FIG. 32.

Figure 32:
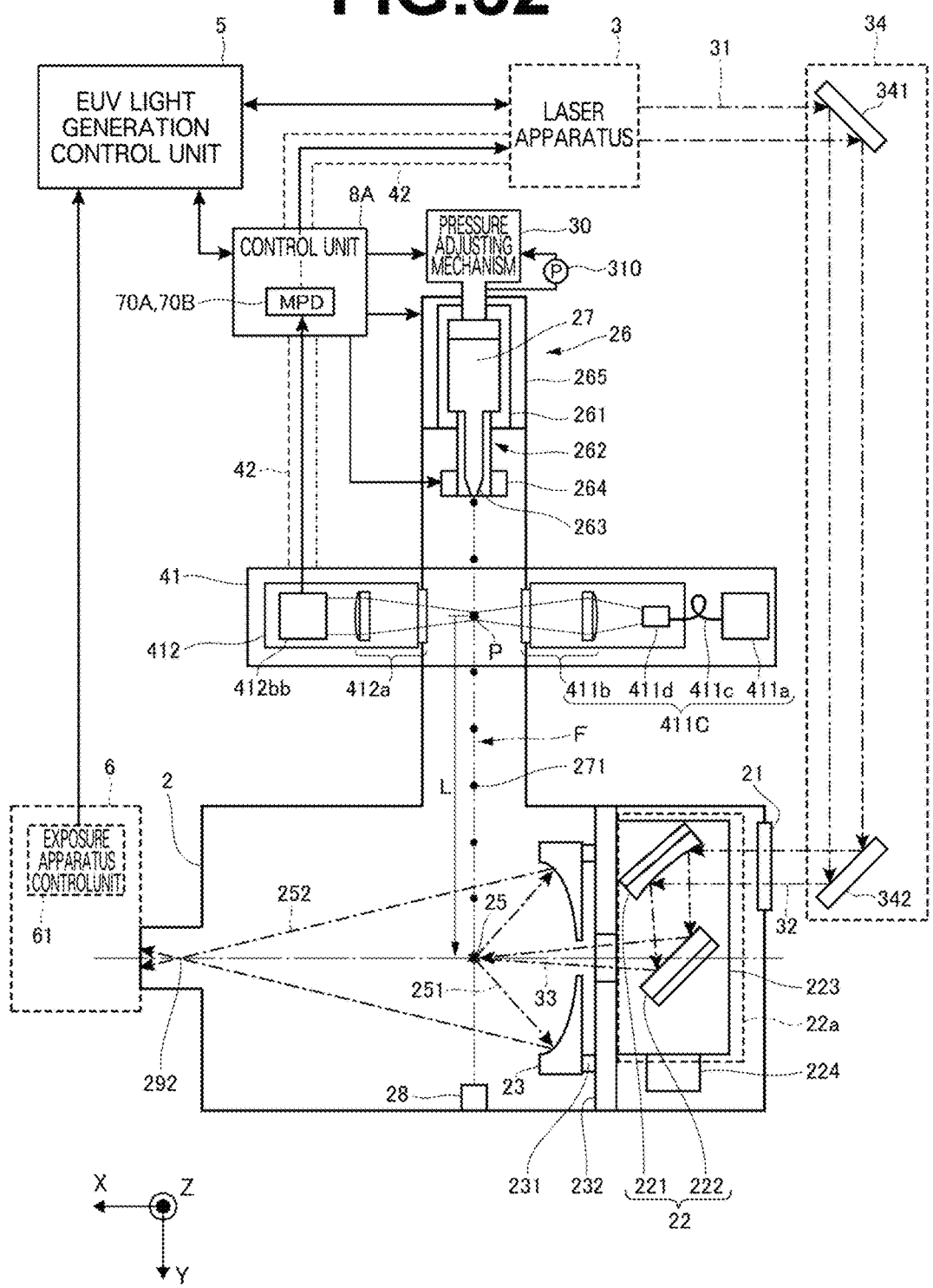
FIG. 32 is a diagram for explaining the configuration of an EUV light generating apparatus equipped with a pressure adjusting mechanism and a timing determining circuit according to a seventh embodiment.

FIG. 32 is a diagram for explaining the configuration of the EUV light generating apparatus 1 equipped with the pressure adjusting mechanism 30 and a timing determining circuit 70 according to a seventh embodiment.

The EUV light generating apparatus 1 of the seventh embodiment may differ from the EUV light generating apparatus 1 illustrated in FIG. 15, and may be provided with a pressure measuring unit 310.

The pressure measuring unit 310 may be provided between pipes that extend from the pressure adjusting mechanism 30 to the tank 261. The pressure measuring unit 310 may be a mechanism capable of measuring pressure, such as a pressure sensor. The pressure measuring unit 310 may measure the pressure within the tank 261, and output the measured pressure to the pressure adjusting mechanism 30.

The pressure adjusting mechanism 30 may adjust the pressure within the tank 261 based on the measured value of the pressure output from the pressure measuring unit 310 such that the pressure within the tank 261 becomes a value which is set based on a control signal from the control unit 8.

In the EUV light generating apparatus 1 of the seventh embodiment, a light source unit 411C of the droplet detector 41 may be different from the light source unit 411 illustrated in FIG. 15. The light source unit 411C may include an optical fiber 411c, through which light output from the light source 411a propagates, and a light output unit 411d that outputs the light which has propagated thereto, in addition to the light source 411a and the illuminating optical system 411b.

The configuration of the passage timing signal system 42 provided in the EUV light generating apparatus 1 of the seventh embodiment will be described with reference to FIG. 33.

Figure 33:
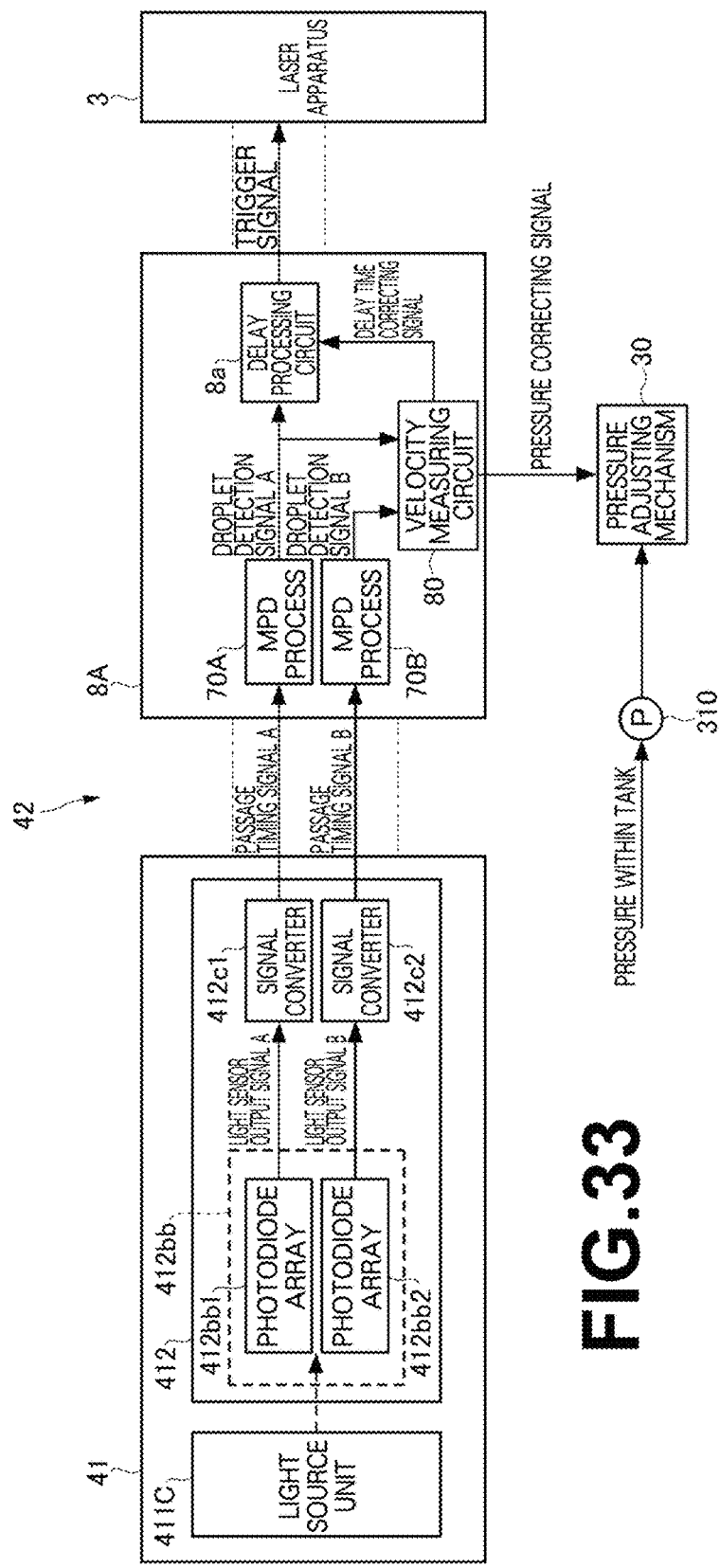
FIG. 33 is a diagram for explaining the configuration of a passage timing signal system provided in the EUV light generating apparatus illustrated in FIG. 32.

FIG. 33 is a diagram for explaining the configuration of the passage timing signal system 42 provided in the EUV light generating apparatus 1 illustrated in FIG. 32.

The droplet detector 41 of the seventh embodiment may differ from the droplet detector 41 illustrated in FIG. 30, and the velocity measuring circuit 80 may be connected to one or both of the delay processing circuit 8a and the pressure adjusting mechanism 30.

[12.2 Operation]

The velocity measuring circuit 80 may calculate one or both of a delay time correcting signal and a pressure correcting signal, based on the travel velocity VM2 of the droplets 271.

Here, the delay time correcting signal may be a signal that provides a correction value $\Delta TS$ in order to correct the delay time TS which is set by the delay processing circuit 8a and is imparted to the droplet detection signals A and B. The delay time TS may be set based on a reference droplet velocity V0, which is a travel velocity of the droplets 271 that functions as a reference.

The velocity measuring circuit 80 may calculate the correction value $\Delta TS$ based on the travel velocity VM2, the reference droplet velocity V0, and the distance between the detection point P and the plasma generating region 25 according to Formula 12 below.

$$\Delta TS = L\{(1/VM) - (1/V0)\}$$ (Formula 12)

Here, the pressure correcting signal may be a signal that imparts a correction value $\Delta PT$ to a control signal for a pressure PT, which is set by the pressure adjusting mechanism 30, to be applied to the target 27 within the tank 261. The pressure PT may be set such that the travel velocity VM2 of the droplets 271 becomes the reference droplet velocity V0. In addition, the distance L may be an actually measured value between the detection point P and the plasma generating region 25 of the EUV light generating apparatus 1, or may be a design value when designing the EUV light generating apparatus 1.

The velocity measuring circuit 80 may calculate the correction value $\Delta PT$ based on the travel velocity VM2 and the reference droplet velocity V0.

The velocity measuring circuit 80 may output the delay time correcting signal that includes the correction value $\Delta TS$ to the delay processing circuit 8a. The velocity measuring circuit 80 may output the pressure correcting signal that includes the correction value $\Delta PT$ to the pressure adjusting mechanism 30.

The delay processing circuit 8a may correct the delay time TS based on the correction value $\Delta TS$. The pressure adjusting mechanism 30 may correct the pressure PT based on the correction value $\Delta PT$.

[12.3 Effect]

According to the EUV light generating apparatus 1 of the seventh embodiment, the delay time TS, which is set by the delay processing circuit 8a, can be corrected based on the travel velocity VM2 of the droplets 271, which is measured by the velocity measuring circuit 80. In addition, according to the EUV light generating apparatus 1 of the seventh embodiment, the pressure PT, which is set by the pressure adjusting mechanism 30, can be corrected based on the travel velocity VM2 of the droplets 271, which is measured by the velocity measuring circuit 80.

Therefore, according to the EUV light generating apparatus 1 of the seventh embodiment, parameters related to the generation of EUV light 252 can be controlled based on the travel velocity VM2. As a result, the accuracy with which the droplets 271 are irradiated with the pulsed laser beam 33 can be improved. For this reason, the EUV light generating apparatus 1 of the seventh embodiment is capable of improving the energy stability of the EUV light 252 and the positional stability of the EUV light 252 within the plasma generating region 25.

[13. Hardware Environment of Control Units]

Those skilled in the art would understand that the matters described above can be executed by combining a general purpose computer or a programmable controller with a program module or a software application. Generally, the program module will include routines, programs, components, and data structures, etc., for executing the processes described in the present disclosure.

Figure 34:
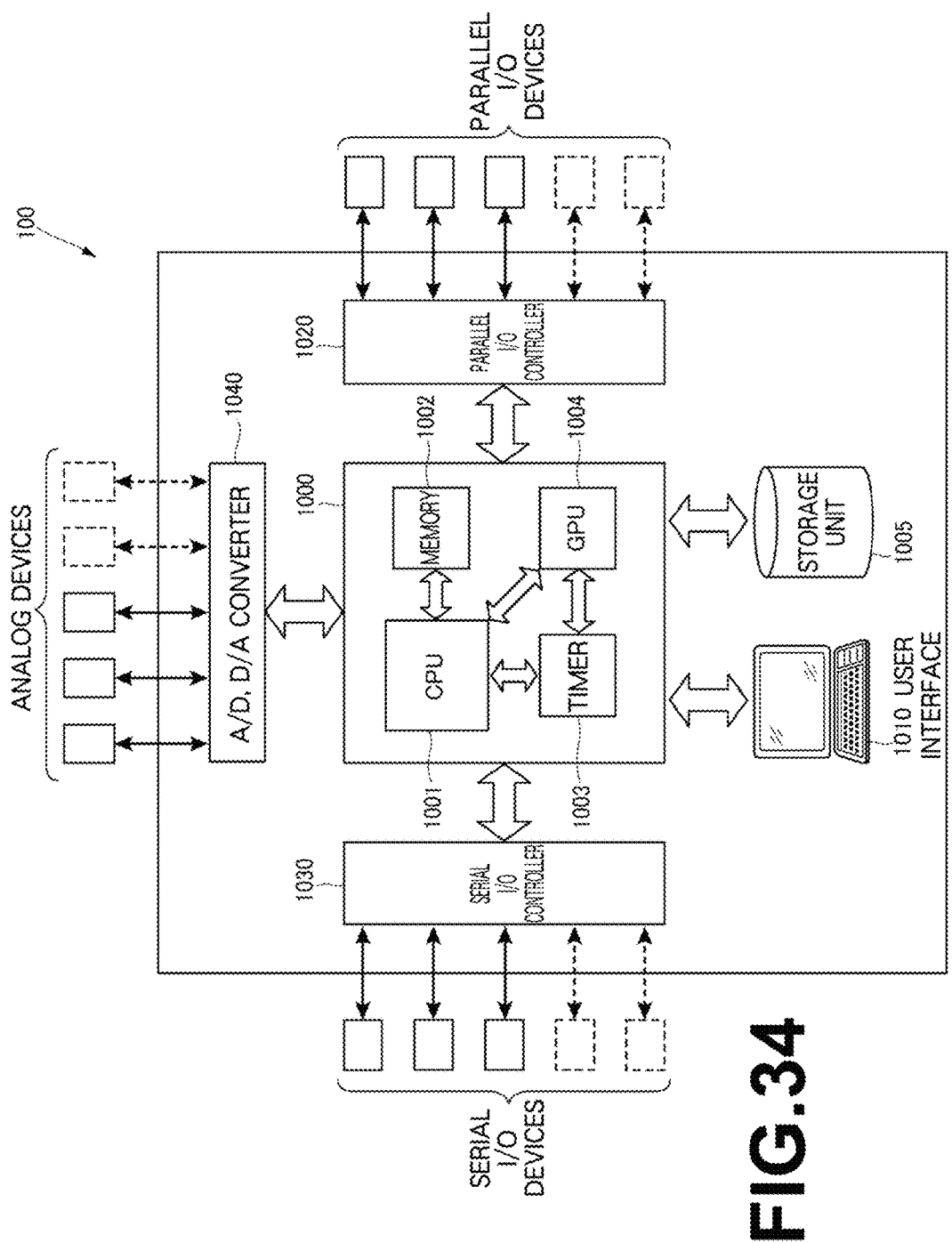
FIG. 34 is a block diagram that illustrates the hardware environment of each control unit.

FIG. 34 is a block diagram that illustrates an exemplary hardware environment in which various aspects of the present disclosure can be implemented. The exemplary hardware environment 100 illustrated in FIG. 34 may include a processing unit 1000, a storage unit 1005, a user interface 1010, a parallel I/O controller 1020, a serial I/O controller 1030, and an A/D, D/A converter 1040. However, the configuration of the hardware environment 100 is not limited to that described above.

The processing unit 1000 may include a central processing unit (CPU) 1001, a memory 1002, a timer 1003, and a graphics processing unit (GPU) 1004. The memory 1002 may include a random access memory (RAM) and a read only memory (ROM). The CPU 1001 may be any commercially available processor. A dual microprocessor or any other multiprocessor architecture may be employed as the CPU 1001.

The components illustrated in FIG. 34 may be interconnected with each other to execute the processes described in the present disclosure.

During operation, the processing unit 1000 may read and execute programs stored in the storage unit 1005, read data together with the programs from the storage unit 1005, and write data to the storage unit 1005. The CPU 1001 may execute programs read out from the storage unit 1005. The memory 1002 may be a work area in which programs executed by the CPU 1001 and data used in the operation of the CPU 1001 are temporarily stored. The timer 1003 may measure temporal intervals and output the results of measurement to the CPU 1001 according to the execution of programs. The GPU 1004 may process image data according to programs read from the storage unit 1005, and output the results of processing to the CPU 1001.

The parallel I/O controller 1020 may be connected to parallel I/O devices which are capable of communicating with the processing unit 1000, such as the EUV light generation control unit 5, the control unit 8, the control units 8A through 8C, the timing determining circuits 70 through 72, the velocity measuring circuit 80, and the laser beam propagating direction control unit 34. The parallel I/O controller 1020 may control communications among the processing unit 1000 and the parallel I/O devices. The serial I/O controller 1030 may be connected to serial I/O devices which are capable of communicating with the processing unit 1000, such as the light source 411a, the light source 411C, the light source 412i, the pressure adjusting mechanism 30, and the stage 224. The serial I/O controller 1030 may control communications among the processing unit 1000 and the serial I/O devices. The A/D, D/A converter 1040 may be connected to analog devices, including various sensors such as a temperature sensor, a pressure sensor, a vacuum meter, the target sensor 4, the light sensor 412b, the light sensor 412ba, and the pressure measuring unit 310, via an analog port. The A/D, D/A 1040 converter may control communications among the processing unit 1000 and the analog devices, and perform A/D as well as D/A conversion of the contents of the communications.

The user interface 1010 may display the progress of programs which are being executed by the processing unit 1000 to an operator, such that the operator can command the processing unit 1000 to cease executing programs or to execute interruption routines.

The exemplary hardware environment 100 may be applied to the configurations of the EUV light generation control unit 5, the control unit 8, the control units 8A through 8C, the timing determining circuits 70 through 72, the velocity measuring circuit 80, and the laser beam propagating direction control unit 34 of the present disclosure. Those skilled in the art would understand that these controllers may also be realized in a distributed computing environment, that is, an environment in which tasks are executed by processing units which are connected to each other via a communications network. In the present disclosure, the EUV light generation control unit 5, the control unit 8, the control units 8A through 8C, the timing determining circuits 70 through 72, the velocity measuring circuit 80, and the laser beam propagating direction control unit 34 may be connected to each other via a communications network such as an Ethernet and the Internet. In a distributed computing environment, program modules may be stored in both local and remote memory storage devices.

It would be obvious to those skilled in the art that the technologies which are described in the above embodiments and modifications thereto may be combined with each other.

The description above is intended to be illustrative and the present disclosure is not limited thereto. Therefore, it would be obvious to those skilled in the art that various modifications to the embodiments of the present disclosure would be possible as long as they do not stray from the spirit and the scope of the appended claims.

The terms which are employed in the present specification and the appended claims are to be interpreted as "not limiting". For example, the terms "include" and "including" are to be interpreted to mean "including the described elements but not limited thereto". The term "have" is to be interpreted to mean "having the described elements but not limited thereto". Further, the indefinite articles "a" and "an", as well as the word "one" in the present specification as well as the appended claims are to be interpreted to mean "at least one" or "one or more".

What is claimed is:

1. A droplet detector, comprising:
a light source unit configured to emit illuminating light onto a droplet, which is output into a chamber, and to generate extreme ultraviolet light when irradiated with a laser beam;
a light receiving unit configured to receive the illuminating light and to detect changes in light intensities; and
a timing determining circuit configured to output a droplet detection signal that indicates that the droplet has been detected at a predetermined position within the chamber, based on a first timing at which the light intensity of the illuminating light decreases due to the droplet being irradiated therewith and a second timing at which the light intensity of the illuminating light increases due to the droplet being not irradiated therewith, wherein:
the timing determining circuit:
specifies the first timing by detecting a timing at which the light intensity becomes less than a predetermined threshold value and specifies the second timing by detecting a timing at which the light intensity becomes greater than the threshold value;
determines a midpoint between the first timing and the second timing; and outputs the droplet detection signal at a timing which is delayed for a predetermined amount of time from the midpoint between the first timing and the second timing.

2. The droplet detector as defined in claim 1, wherein:
the timing determining circuit:
integrates a predetermined value based on one of the first timing and the second timing per unit time to calculate a first integrated value, and integrates a value twice the predetermined value based on the other of the first timing and the second timing per unit time to calculate a second integrated value; and
specifies a timing at which a predetermined amount of delay time has elapsed from the midpoint, by detecting a timing at which a total integrated value obtained by adding the first integrated value and the second integrated value reaches a predetermined reference value.

3. The droplet detector as defined in claim 2, wherein:
the light receiving unit is constituted employing a photodiode array.

4. The droplet detector as defined in claim 3, further comprising:
a velocity measuring circuit configured to measure a travel velocity of the droplet based on the droplet detection signal; wherein:
the light receiving unit is constituted employing a plurality of photodiode arrays which are arranged with an interval along a direction in which the droplets travels;
the timing determining circuit outputs the droplet detection signals for each of the photodiode arrays; and
the velocity measuring circuit measures the travel velocity based on the droplet detection signals which are output for each of the photodiode arrays.

5. An extreme ultraviolet light generating apparatus, comprising:
a chamber, at a predetermined region within which extreme ultraviolet light is generated;
a target supply unit configured to output droplets so as to supply the droplets into the predetermined region;
a light source unit configured to emit illuminating light onto the droplets at a predetermined position between the target supply unit and the predetermined region;
a light receiving unit configured to receive the illuminating light and to detect changes in light intensities;
a timing determining circuit configured to output droplet detection signals that indicate that the droplets have been detected at a predetermined position within the chamber, based on first timings at which the light intensity of the illuminating light decreases due to the droplets being irradiated therewith and second timings at which the light intensity of the illuminating light increases due to the droplet being not irradiated therewith; and
a control unit that outputs signals which cause a laser apparatus to output a laser beam toward the predetermined region, based on the droplet detection signals, wherein:
the timing determining circuit:
specifies the first timing by detecting a timing at which the light intensity becomes less than a predetermined threshold value and specifies the second timing by detecting a timing at which the light intensity becomes greater than the threshold value;
determines a midpoint between the first timing and the second timing; and
outputs the droplet detection signal at a timing which is delayed for a predetermined amount of time from the midpoint between the first timing and the second timing.

6. The extreme ultraviolet light generating apparatus as defined in claim 5, further comprising:
a velocity measuring circuit configured to measure a travel velocity of the droplets based on the droplet detection signals; wherein:
the light receiving unit is constituted employing a plurality of photodiode arrays which are arranged with an interval along a direction in which the droplets travel;
the timing determining circuit outputs the droplet detection signals for each of the photodiode arrays; and
the velocity measuring circuit measures the travel velocity based on the droplet detection signals which are output for each of the photodiode arrays.

7. The extreme ultraviolet light generating apparatus as defined in claim 6, wherein:
the control unit outputs the signals by adding a delay time to the droplet detection signals; and
the velocity measuring circuit:
calculates a correction value for the delay time based on the travel velocity; and
outputs the correction value for the delay time to the control unit.

8. The extreme ultraviolet light generating apparatus as defined in claim 6, wherein:
the target supply unit comprises a tank configured to store a target substance before the droplets are supplied, and a pressure adjusting mechanism configured to adjust the pressure within the tank to a predetermined pressure; and
the velocity measuring circuit:
calculates a correction value for the pressure based on the travel velocity; and
outputs the correction value for the pressure to the pressure adjusting mechanism.

* * * * *